United States Patent
Kubo et al.

(10) Patent No.: US 12,179,246 B2
(45) Date of Patent: Dec. 31, 2024

(54) PRODUCTION METHOD FOR HOT PRESS MOLDED ARTICLES, PRESS MOLDED ARTICLE, DIE MOLD, AND MOLD SET

(71) Applicant: NIPPON STEEL CORPORATION, Tokyo (JP)

(72) Inventors: Masahiro Kubo, Tokyo (JP); Soshi Fujita, Tokyo (JP); Yoshiaki Nakazawa, Tokyo (JP); Hideaki Irikawa, Tokyo (JP); Masahiro Fuda, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 1060 days.

(21) Appl. No.: 17/044,194

(22) PCT Filed: Apr. 9, 2019

(86) PCT No.: PCT/JP2019/015517
§ 371 (c)(1),
(2) Date: Sep. 30, 2020

(87) PCT Pub. No.: WO2019/198728
PCT Pub. Date: Oct. 17, 2019

(65) Prior Publication Data
US 2021/0114074 A1    Apr. 22, 2021

(30) Foreign Application Priority Data

Apr. 13, 2018    (JP) .................................. 2018-077794

(51) Int. Cl.
*B21D 22/02*    (2006.01)
*B32B 15/01*    (2006.01)
(Continued)

(52) U.S. Cl.
CPC .......... *B21D 22/022* (2013.01); *B32B 15/012* (2013.01); *C21D 1/673* (2013.01);
(Continued)

(58) Field of Classification Search
CPC ...... B21D 22/022; B21D 22/02; B21D 22/10; B21D 37/01; B21D 37/10; B21D 37/20
See application file for complete search history.

(56) References Cited

U.S. PATENT DOCUMENTS

2007/0017272 A1\* 1/2007 Kurisu ................. B21D 22/022
                                                   72/342.2
2008/0073482 A1   3/2008 Inoue et al.
(Continued)

FOREIGN PATENT DOCUMENTS

JP    2005-305510 A    11/2005
JP    4771223 B2       9/2011
(Continued)

OTHER PUBLICATIONS

International Search Report for PCT/JP2019/015517 (PCT/ISA/210) mailed on Jul. 16, 2019.

*Primary Examiner* — Teresa M Ekiert
(74) *Attorney, Agent, or Firm* — SOLARIS Intellectual Property Group, PLLC

(57) ABSTRACT

A method of producing a hot press-formed product includes subjecting an Al-plated steel sheet having a zinc compound layer or a metallic zinc layer, as an outermost layer, provided on an Al plating layer to hot press forming using a die. The die includes a hard layer having a skewness (Rsk), as measured in a direction from the outside of a die hole toward the inside of the die hole, of 1.3 or less and a hardness Hv_Die of HV 2,000 or more, over the entirety of a region of a steel sheet contact surface that is adjacent to a die shoulder portion. The steel sheet contact surface is a surface located outside of the die hole and configured to contact the
(Continued)

Al-plated steel sheet that is to be subjected to the hot press forming.

28 Claims, 8 Drawing Sheets

(51) Int. Cl.
    *C21D 1/673*     (2006.01)
    *C23C 2/26*     (2006.01)
    *C23C 2/28*     (2006.01)
    *C22C 38/00*     (2006.01)
    *C22C 38/02*     (2006.01)
    *C22C 38/04*     (2006.01)
    *C22C 38/14*     (2006.01)

(52) U.S. Cl.
    CPC .................. *C23C 2/26* (2013.01); *C23C 2/28* (2013.01); *C23C 2/29* (2022.08); *C22C 38/002* (2013.01); *C22C 38/02* (2013.01); *C22C 38/04* (2013.01); *C22C 38/14* (2013.01)

(56) References Cited

U.S. PATENT DOCUMENTS

| | | |
|---|---|---|
| 2011/0030441 A1 | 2/2011 | Maki et al. |
| 2014/0023740 A1 | 1/2014 | Kashi et al. |
| 2015/0020562 A1 | 1/2015 | Yamanaka et al. |
| 2016/0060735 A1 | 3/2016 | Maki et al. |
| 2017/0036259 A1* | 2/2017 | Yamamoto ............. B21D 37/01 |
| 2017/0165737 A1* | 6/2017 | Yamamoto ............. B21D 37/01 |
| 2018/0141102 A1 | 5/2018 | Honda |

FOREIGN PATENT DOCUMENTS

| | | |
|---|---|---|
| JP | 2012-232344 A | 11/2012 |
| JP | 2014-139350 A | 7/2014 |
| WO | WO 2009/131233 A1 | 10/2009 |
| WO | WO 2014/171417 A1 | 10/2014 |
| WO | WO 2016/171273 A1 | 10/2016 |
| WO | WO 2017/029773 A1 | 2/2017 |

* cited by examiner

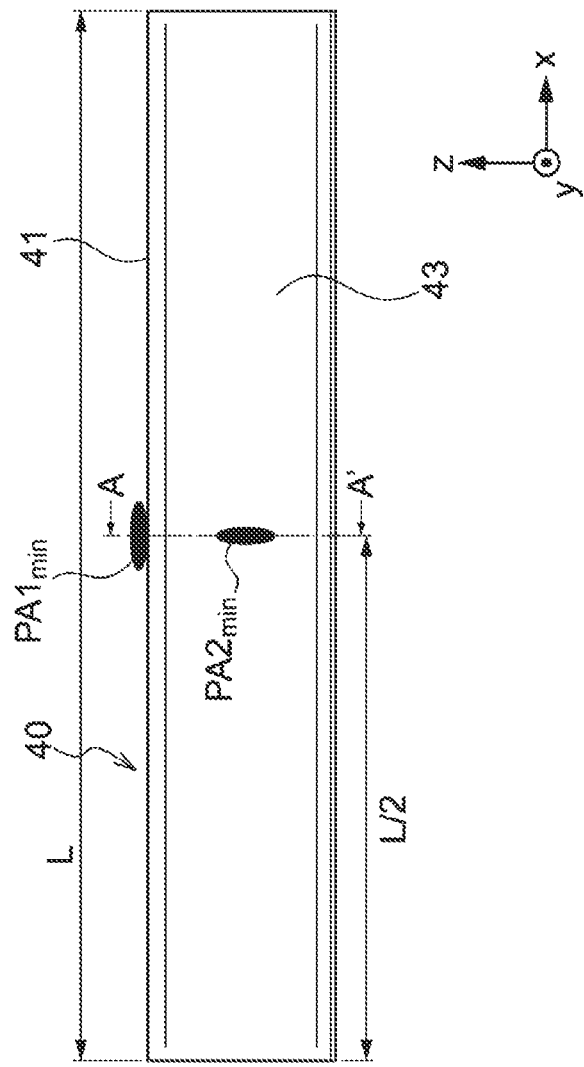

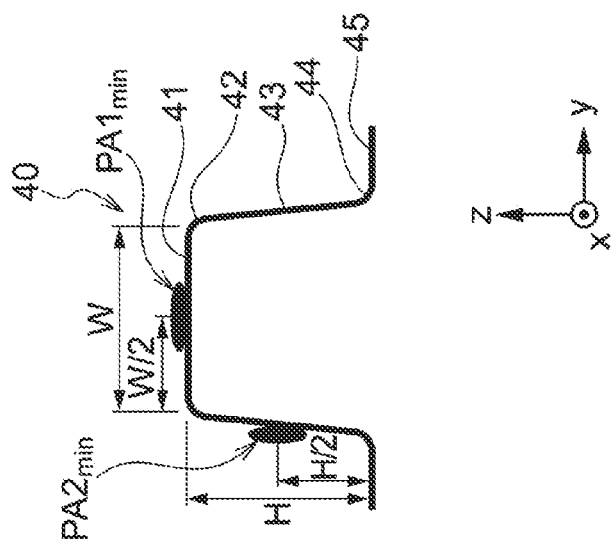

PRODUCTION METHOD FOR HOT PRESS MOLDED ARTICLES, PRESS MOLDED ARTICLE, DIE MOLD, AND MOLD SET

TECHNICAL FIELD

The present disclosure relates to a method of producing a hot press-formed product, a press-formed product, a die, and die sets.

BACKGROUND ART

In recent years, reduction in the consumption of chemical fuels is more strongly requested for protection of environment and prevention of global warming. This request affects various kinds of manufacturing industries. This also applies to automobiles, and, for example, an improvement in fuel efficiency by weight reduction in vehicle body and the like is desired. However, in the case of automobiles, both a weight reduction in vehicle body and safety need to be achieved.

Many of the vehicle structural elements of automobiles are formed of iron, particularly, formed from steel sheets. When reducing the weight of the vehicle body, it is desired to reduce the body weight while maintaining the strength of the structural materials formed from steel sheets. Such a request concerning steel sheets is imposed not only in automobile manufacturing industries, but also in manufacturing industries in various fields, as well. An enhancement in mechanical strength of steel sheets makes it possible to maintain or enhance the mechanical strength of the structural materials, even with a smaller thickness than that of conventionally used steel sheets.

In general, a material having a higher mechanical strength tends to have a lower shape fixability in forming processing, such as bending. In other words, in the case of processing the material to have a complex shape, the processing itself is difficult. Examples of means for solving such a problem associated with formability include a so-called "hot press forming (hot pressing, high-temperature pressing, or die quenching). In hot press forming, a steel sheet, which is an object to be formed, is heated to a high temperature, and the steel sheet softened by the heating is subjected to stamping to perform forming, followed by cooling.

In hot press forming, the steel sheet can easily be stamped since the steel sheet is temporarily softened by being heated to a high temperature. Further, the mechanical strength of the steel sheet can be enhanced by a quenching effect provided by the cooling after the forming. Therefore, using hot press forming, it is possible to obtain a formed product having both a favorable shape fixability and a high mechanical strength.

However, when a steel sheet is heated to a high temperature of 800° C. or higher, surfaces of the steel sheet are oxidized to cause the generation of scales (oxides). In the case of painting or plating a steel sheet in order to ensure corrosion resistance, the presence of scales impede such a treatment. Therefore, after performing the hot press forming, a step (descaling step) of removing the scales is required. In other words, the productivity is poor.

A method that can be used for avoiding the generation of the scales is a method of coating a steel sheet before subjecting the steel sheet to hot press forming. Steel sheets having zinc (Zn)-based plating, which are steel sheets plated with zinc having a sacrificial corrosion-protective effect, are widely used as steel sheets for automobile and the like, due to their corrosion protection performance and steel sheet production technology. However, a heating temperature (a temperature of from 700 to 1,000° C.) in hot press forming is higher than the boiling point of zinc. Therefore, when a steel sheet having Zn-based plating is heated for hot press forming, the plating layer formed on the surface of the steel sheet may evaporate and cause a significant deterioration in surface texture.

Accordingly, it is preferable to use a so-called aluminum (Al)-plated steel sheet, which is a steel sheet provided with a coating of an Al-based metal having a higher boiling point than that of a Zn-based metal coating, as the steel sheet to be subjected to hot press forming in which the steel sheet is heated to a high temperature.

By providing an Al-based metal coating to a steel sheet, attachment of scales to the surface of the steel sheet can be prevented, and a step such as a descaling step is unnecessary, as a result of which the productivity can be improved. Further, an Al-based metal coating also has an antirust effect, and thus improves corrosion resistance after painting.

In a case in which a steel sheet is provided with an Al-based metal coating, the Al coating melts, and then transforms into an aluminum-iron alloy layer due to diffusion of Fe from the steel sheet, depending on preheating conditions before performing the press forming. Further, there is a case in which the aluminum-iron alloy layer grows to such an extent that even the surface of the steel sheet is transformed into the aluminum-iron alloy layer. Hereinafter, the aluminum-iron alloy is also referred to as "Al—Fe alloy" or "alloy". Since this alloy layer is extremely hard, processing defects are formed due to contact with a die during stamping. Reduction of the processing defects is a challenge associated with hot press forming of an Al-plated steel sheet.

Patent Document 1 discloses a method in which a film of a wurtzite-type compound such as a zinc oxide film (hereinafter, also referred to as "ZnO film") is formed on the surface of an Al-plated steel sheet, for the purpose of improving hot lubricity as well as chemical conversion treatability and corrosion resistance, in order to prevent the occurrence of processing defects.

Patent Document 2 discloses a method in which a film made of one or more Zn compounds selected from the group consisting of Zn hydroxide, Zn phosphate, and Zn organic acid is formed on the surface of an Al-plated steel sheet, for the purpose of enhancing the adhesion of a ZnO film during press forming. In the method disclosed in Patent Document 2, a film of ZnO is generated and a ZnO film having an excellent adhesion is formed, by the heat generated when the Al-plated steel sheet provided with the film of the Zn compound(s) is subjected to hot press forming, as a result of which hot lubricity, film adhesion, spot weldability, and corrosion resistance after painting can be improved.

Further, Patent Document 3 discloses a die which includes a coating layer formed by physical vapor deposition on a surface of the die. The coating layer includes at least three coating layers, which are a "layer a" as an outermost layer, a "layer c" formed directly on a base material, and a "layer b" formed between the "layer a" and the "layer c". The die disclosed in Patent Document 3 is a die for plastic working, wherein the hardnesses as represented by a hardness symbol HV 0.025 and layer thicknesses of the three layers are regulated to have specific a relationships.

Patent Document 1: International Publication (WO) No. 2009/131233

Patent Document 2: Japanese Patent Application Laid-Open (JP-A) No. 2014-139350 A Patent Document 3: Japanese Patent Publication (JP-B) No. 4771223

SUMMARY OF INVENTION

Technical Problem

Both of the steel sheets disclosed in Patent Documents 1 and 2 have an excellent hot lubricity, and enable reduction of the occurrence of processing defects.

In general, when a non-plated material or a plated steel sheet is subjected to hot press forming, wear occurs on sliding surfaces of a die for hot press forming against which the plated steel sheet, such as portions of the plated steel sheet that will become a vertical wall portion and a flange portion of the press-formed product, slides. Therefore, at a portion that experiences a high surface pressure during the hot press forming, maintenance of the die is required in order to deal with the wear that occurs on the sliding surface of the die. Although the plated steel sheets disclosed in Patent Documents 1 and 2 were expected to reduce the die wear, the plated steel sheets of Patent Documents 1 and 2 failed to overcome the problem of the die wear, as with the case of other non-plated materials and plated steel sheets.

Further, the use of the die for plastic working which includes a coating layer on the surface of the die as disclosed in Patent Document 3 also failed to overcome the problem of the wear on the sliding surface of the die, at portions that experience a high surface pressure during the hot press forming.

An object of the present disclosure is to provide a method of producing a hot press-formed product capable of reducing the occurrence of wear on a sliding surface of a die during hot press forming of an Al-plated steel sheet that includes a zinc compound layer or a metallic zinc layer, as an outermost surface layer, provided on an Al plating layer.

Another object of the present disclosure is to provide a die in which the occurrence of wear on the sliding surface is reduced, a die set including the die and a punch, as well as a die set including the die and a steel blank holder.

Still another object of the present disclosure is to provide a press-formed product which has an excellent surface quality and in which the occurrence of delayed fracture is reduced.

Solution to Problem

The gist of the present disclosure is as follows.
<1> A method of producing a hot press-formed product, the method including:
  subjecting an Al-plated steel sheet to hot press forming using a die, the Al-plated steel sheet having a zinc compound layer or a metallic zinc layer, as an outermost surface layer, provided on an Al plating layer,
  wherein the die includes a hard layer having a skewness (Rsk), as measured in a direction from an outside of a die hole toward an inside of the die hole, of 1.3 or less, and a hardness Hv_Die of HV 2,000 or more, over an entirety of a region of a steel sheet contact surface that is adjacent to a die shoulder portion, the steel sheet contact surface being located outside of the die hole and configured to contact the Al-plated steel sheet that is to be subjected to the hot press forming.

<2> The method of producing a hot press-formed product according to <1>, wherein the skewness (Rsk) of the hard layer is −5.0 or more.
<3> The method of producing a hot press-formed product according to <1> or <2>, wherein the hard layer includes: a nitride layer; and a hard coating layer provided on a surface of the nitride layer.
<4> The method of producing a hot press-formed product according to <3>, wherein the hard coating layer has a hardness Hv_Die of HV 3,200 or less.
<5> The method of producing a hot press-formed product according to <4>, wherein the hard coating layer includes Cr.
<6> The method of producing a hot press-formed product according to <3>, wherein the hard coating layer includes Ti and has a hardness Hv_Die of HV 3,160 or less.
<7> The method of producing a hot press-formed product according to any one of <3> to <6>, wherein the hard coating layer has a hardness Hv_Die of from HV 2,500 to HV 3,000.
<8> A press-formed product, including:
  a steel base material having a hardness Hv_Parts of HV 400 or more;
  an Al plating layer provided on the steel base material; and
  a zinc oxide layer, as an outermost layer, provided on the Al plating layer,
  wherein the press-formed product includes:
  a top wall portion;
  a vertical wall portion connected to the top wall portion via a first ridge portion; and
  a flange portion connected to the vertical wall portion via a second ridge portion,
  wherein a position in the second ridge portion at which a curvature radius is smallest has a curvature radius [$R_{min}$] of from 3 mm to less than 10 mm,
  wherein, when transverse cross-sections of the press-formed product are observed to define a transverse cross-section in which the curvature radius of the second ridge portion is smallest, a difference [SaA1−SaA2] between a smoothness [SaA1] at a central portion $PA1_{min}$ in a cross-sectional width direction of the top wall portion, and a smoothness [SaA2] at a central portion $PA2_{min}$ in a cross-sectional height direction of the vertical wall portion, is 0.20 μm or more in the transverse cross-section, and
  wherein a difference [StrA1−StrA2] between a surface texture aspect ratio [StrA1] at the portion $PA1_{min}$ in the top wall portion, and a surface texture aspect ratio [StrA2] at the portion $PA2_{min}$ in the vertical wall portion, is 0.50 or less.
<9> A press-formed product, including:
  a steel base material having a hardness Hv_Parts of HV 400 or more;
  an Al plating layer provided on the steel base material; and
  a zinc oxide layer, as an outermost surface layer, provided on the Al plating layer,
  wherein the press-formed product includes:
  a top wall portion;
  a vertical wall portion connected to the top wall portion via a first ridge portion; and
  a flange portion connected to the vertical wall portion via a second ridge portion, wherein a position in the second ridge portion at which a curvature radius is smallest has a curvature radius [$R_{min}$] of from 3 mm to less than 10 mm, wherein a difference [SaB1−SaB2] between a smoothness [SaB1] at a central portion PB1$_{min}$ which is a central portion in a width direction of the top wall portion corresponding to a portion PB0$_{min}$ at which a curvature radius of the flange portion is smallest when observed from a side surface side, and a smoothness [SaB2] at a central portion PB2$_{min}$ which is a central portion in a height direction of the vertical wall portion corresponding to the portion PB0$_{min}$ when observed from the side surface side, is 0.30 μm or more, and wherein a difference [StrB1−StrB2] between a surface texture aspect ratio [StrB1] at the portion PB1$_{min}$ in the top wall portion, and a surface texture aspect ratio [StrB2] at the portion PB2$_{min}$ in the vertical wall portion, is 0.50 or less.

<10> A die, including a hard layer having a skewness (Rsk), as measured in a direction from an outside of a die hole toward an inside of the die hole, of 1.3 or less, and a hardness Hv_Die of HV 2,000 or more, over an entirety of a region of a die shoulder adjacent surface that is adjacent to a die shoulder portion, the die shoulder adjacent surface being located outside of the die hole and adjacent to the die shoulder portion.

<11> The die according to <10>, wherein the skewness (Rsk) of the hard layer is −5.0 or more.

<12> The die according to <10> or <11>, wherein the hard layer includes: a nitride layer; and a hard coating layer provided on a surface of the nitride layer.

<13> The die according to <12>, wherein the hard coating layer has a hardness Hv_Die of 3,200 or less.

<14> The die according to <13>, wherein the hard coating layer includes Cr.

<15> The die according to <12>, wherein the hard coating layer includes Ti and has a hardness Hv_Die of HV 3,160 or less.

<16> The die according to any one of <12> to <15>, wherein the hard coating layer has a hardness Hv_Die of from HV 2,500 to HV 3,000.

<17> A die set, including:
the die according to any one of <10> to <16>; and
a punch,
wherein the punch includes a second hard layer having a skewness (Rsk), as measured in a direction from an outside of a punch portion toward an inside of the punch portion, of 1.3 or less, and a hardness Hv_Die of HV 2,000 or more, over an entirety of a region of a facing surface that faces the region of the die provided with the hard layer, the facing surface facing the die shoulder adjacent surface of the die.

<18> The die set according to <17>, wherein the skewness (Rsk) of the second hard layer is −5.0 or more.

<19> The die set according to <17> or <18>, wherein the second hard layer includes: a second nitride layer; and a second hard coating layer provided on a surface of the second nitride layer.

<20> The die set according to <19>, wherein the second hard coating layer has a hardness Hv_Die of HV 3,200 or less.

<21> The die set according to <20>, wherein the second hard coating layer includes Cr.

<22> The die set according to <19>, wherein the second hard coating layer includes Ti and has a hardness Hv_Die of HV 3,160 or less.

<23> The die set according to any one of <19> to <22>, wherein the second hard coating layer has a hardness Hv_Die of from HV 2,500 to HV 3,000.

<24> A die set including:
the die according to any one of <10> to <16>; and
a steel blank holder,
wherein the steel blank holder includes a second hard layer having a skewness (Rsk), as measured in a direction from an outside of a punch-insertion portion toward an inside of the punch-insertion portion, of 1.3 or less, and a hardness Hv_Die of HV 2,000 or more, over an entirety of a region of a facing surface that faces the region of the die provided with the hard layer, the facing surface facing the die shoulder adjacent surface of the die.

<25> The die set according to <24>, wherein the skewness (Rsk) of the second hard layer is −5.0 or more.

<26> The die set according to <24> or <25>, wherein the second hard layer includes: a second nitride layer; and a second hard coating layer provided on a surface of the second nitride layer.

<27> The die set according to <26>, wherein the second hard coating layer has a hardness Hv_Die of HV 3,200 or less.

<28> The die set according to <27>, wherein the second hard coating layer includes Cr.

<29> The die set according to <26>, wherein the second hard coating layer includes Ti and has a hardness Hv_Die of HV 3,160 or less.

<30> The die set according to any one of <26> to <29>, wherein the second hard coating layer has a hardness Hv_Die of from HV 2,500 to HV 3,000.

Advantageous Effects of Invention

According to the present disclosure, it is possible to provide a method of producing a hot press-formed product capable of reducing the occurrence of wear on a sliding surface of a die during hot press forming on an Al-plated steel sheet that includes a zinc compound layer or a metallic zinc layer, as an outermost surface layer, provided on an Al plating layer.

According to the present disclosure, it is also possible to provide a die in which the occurrence of wear on the sliding surface is reduced, a die set including the die and a punch, as well as a die set including the die and a steel blank holder.

Further, according to the present disclosure, it is possible to provide a press-formed product which has an excellent surface quality and in which the occurrence of delayed fracture is reduced.

BRIEF DESCRIPTION OF DRAWINGS

FIG. 3A is a schematic side view illustrating another example of a press-formed product obtained by the hot press forming according to the present embodiment.

FIG. 3B is a cross-sectional view of the press-formed product shown in FIG. 3A.

DESCRIPTION OF EMBODIMENTS

Figure 1:
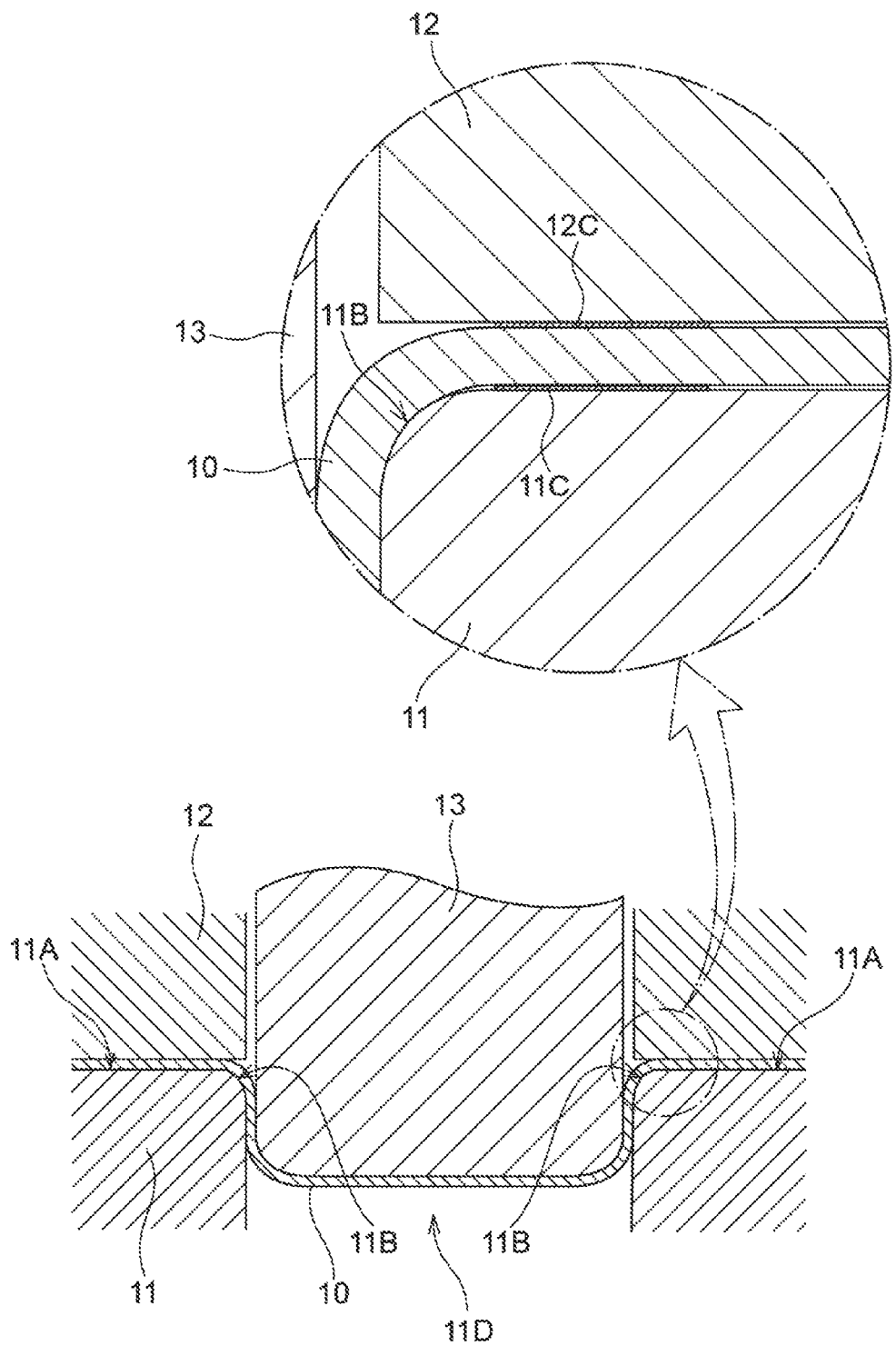
FIG. 1 is a schematic diagram illustrating one example of a plated steel sheet that is being subjected to hot press forming using a die, a holder (steel blank holder), and a punch.

The present disclosure will be described in detail.

Preferable embodiments of the present disclosure will be described in detail below, with reference to accompanying drawings. It is noted, in the present specification and the drawings, there are cases in which components having substantially the same functions and structures are denoted by the same reference characters, and redundant descriptions thereof are omitted.

<Method of Producing Hot Press-Formed Product>

A method of producing a hot press-formed product according to one embodiment of the present disclosure will be described.

The method of producing a hot press-formed product according to the present embodiment is a method of producing a hot press-formed product, the method including subjecting an Al-plated steel sheet to hot press forming using a die, the Al-plated steel sheet including a zinc compound layer or a metallic zinc layer, as an outermost surface layer, provided on an Al plating layer.

The die includes a hard layer having a skewness (Rsk), as measured in a direction from the outside of a die hole toward the inside of the die hole, of 1.3 or less, and a hardness Hv_Die of HV 2,000 or more, over the entirety of a region of a steel sheet contact surface that is adjacent to a die shoulder portion, the steel sheet contact surface being located outside of the die hole and configured to contact the Al-plated steel sheet that is to be subjected to the hot press forming.

Due to the above-described configuration, the method of producing a hot press-formed product according to the present embodiment reduces the occurrence of wear on the sliding surface of the die, which otherwise occurs at a high surface pressure portion during the hot press forming. We have found the method of producing a hot press-formed product according to the present embodiment, based on the following findings.

When a conventional Al-plated steel sheet (a plated steel sheet having an Al plating layer provided on both surfaces) for hot press forming is subjected to hot press forming, seizure occurs due to reaction of aluminum contained in the Al plating layer and the material (iron) contained in a die. There are cases in which the intermetallic compound (aluminum adhesion) generated by the seizure attaches to a surface of the die in a large amount.

In order to reduce the aluminum adhesion to a die, each of Patent Documents 1 and 2 proposes a plated steel sheet obtained by forming an Al plating layer on both sides of a steel sheet, and further forming a ZnO film on a surface of each Al plating layer (hereinafter also referred to as "Al-plated steel sheet with a ZnO film").

In the Al-plated steel sheet with a ZnO film, the surface of each Al plating layer is covered with a ZnO film. Therefore, the aluminum adhesion to the surface of the die due to seizure can be reduced, even when the Al-plated steel sheet with a ZnO film is subjected to hot press forming. As a result, a friction coefficient between the plated steel sheet and the surface of the die is reduced.

However, the die wears even when the ZnO film is present. A region, adjacent to the die shoulder portion, of a surface that is located outside of the die hole and against which a plated steel sheet slides during hot press forming experiences a high surface pressure. Therefore, when an Al-plated steel sheet is used, there is a case in which wear occurs on the sliding surface of the die, regardless of the presence or absence of the ZnO film.

In the present embodiment, in contrast, a hard layer is provided over the entirety of a region of a steel sheet contact surface that is adjacent to the die shoulder portion, the steel sheet contact surface being located outside of the die hole of the die and configured to contact an Al-plated steel sheet that is to be subjected to hot press forming. The hard layer has a skewness (Rsk), as measured in a direction from the outside of the die hole toward the inside of the die hole, of 1.3 or less.

The skewness Rsk as used herein is defined in JIS B 0601 (2001), and is an index that indicates symmetry of protruding portions and recess portions defined relative to a mean line. When the Rsk is positive (0<Rsk), it indicates a state in which the protruding portions and the recess portions localize on the lower side of the mean line. A Rsk that is negative (Rsk<0) indicates a state in which the protruding portions and the recess portions localize on an upper side of the mean line. In other words, when the Rsk is negative (Rsk<0), there are only a few protruding portions that protrude from the surface. A skewness (Rsk) within the above-described range indicates a state where there are only a few protruding portions protruding from the surface of the hard layer, in the direction from the outside of the die hole toward the inside of the die hole. In other words, it means that there are only a few protruding portions protruding from the surface of the hard layer, in the direction in which an Al-plated steel sheet slides against the die during hot press forming. Thus, the occurrence of wear is reduced even at a region, adjacent to the die shoulder portion, of the surface against which the plated steel sheet slides, namely, even at a portion that experiences a high surface pressure.

Further, the hard layer described above has a hardness Hv_Die of HV 2,000 or more. When the hard layer, as an outermost surface layer, has a hardness within the above-described range, the wear of the hard layer itself caused by sliding of the hard Al-plated steel sheet is reduced, as a result of which the wear of the die is reduced.

The method of producing a hot press-formed product according to the present embodiment will be described in detail below.

The method of producing a hot press-formed product according to the present embodiment is a method of producing a hot press-formed product in which hot press forming is performed by heating a plated steel sheet, and then stamping the plated steel sheet using a die. In the hot press forming, the plated steel sheet heated to a high temperature is press-formed by the die. Thereafter, the resultant is cooled to obtain a press-formed product having a desired shape.

—Hot Press Forming—

In the press forming, a steel sheet is formed by being drawn into a die hole of a die. In a case in which an edge portion (die shoulder portion) of the die hole is curved to bulge toward the outside of the die hole, the steel sheet undergoes shrink flange deformation when drawn into the die hole.

In the case of drawing, the thickness at a given position of the steel sheet increases as the portion in the steel sheet comes closer to the edge (die shoulder portion) of the die hole in the case of shrink flange deformation. When the thickness at the position of the steel sheet is increased, a high surface pressure is applied to the position of the steel sheet.

In the case of bending, a given position in the steel sheet wrinkles as the position of the steel sheet comes closer to the edge (die shoulder portion) of the die hole in the case of shrink flange deformation. When wrinkles occur in the steel sheet, the wrinkled portion of the steel sheet near the die hole comes into contact with the die, and the contact portion experiences a high surface pressure.

The same applies to hot press forming. The die according to the present embodiment includes a hard layer at a portion at which a high surface pressure is generated.

Figure 2A:
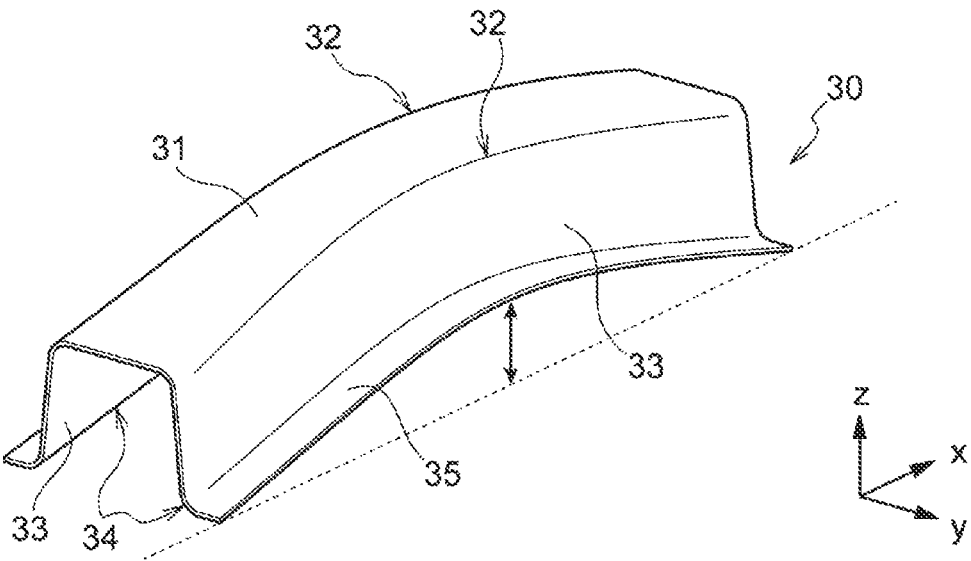
FIG. 2A is a schematic perspective view illustrating one example of a press-formed product obtained by the hot press forming shown in FIG. 1.
Figure 2B:
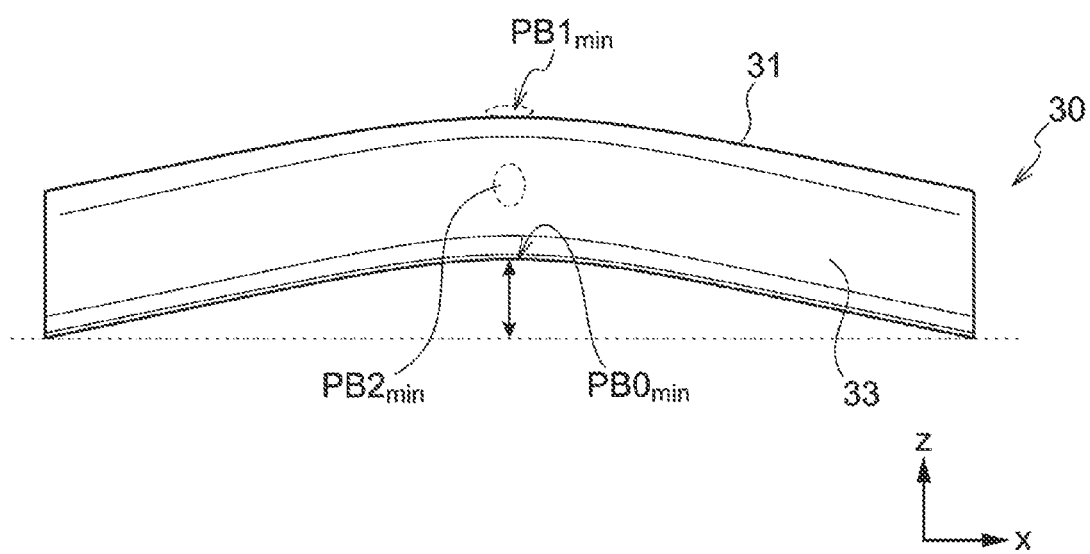
FIG. 2B is a side view of the press-formed product shown in FIG. 2A.

FIG. 1 illustrates a plated steel sheet that is being subjected to hot press forming using a die, a holder (steel blank holder), and a punch. Further, FIG. 2A and FIG. 2B illustrate a hot press-formed product formed by the die shown in FIG. 1. It is noted that FIG. 1 is a cross-sectional view corresponding to a cross section in a y-direction, when a hot press-formed product 30 shown in FIG. 2A is formed using the die. In FIG. 2A and FIG. 2B, the longitudinal direction of the hot press-formed product 30 is defined as the x-direction, and, of the directions orthogonal to the x-direction, a direction of viewing from the vertical wall portion 33 side is defined as the y-direction, and a direction which is orthogonal to the x-direction and the y-direction, and which is the viewing direction from the top wall portion 31 side is defined as the z-direction.

The hot press-formed product 30 shown in FIG. 2A and FIG. 2B includes: two vertical wall portions 33; the top wall portion 31 which connects the two vertical wall portions 33 respectively via first ridge portions 32; and flange portions 35 respectively connected to the two vertical wall portions 33 respectively via second ridge portions 34, at a side opposite to the top wall portion 31. When the hot press-formed product 30 is observed from the side surface side, namely, when observed from the y-direction as shown in FIG. 2B, the hot press-formed product 30 has a shape which includes a portion $PB0_{min}$ at which the curvature radius of the flange portion 35 is smallest. In other words, the flange portion 35 includes a portion in the length in the longitudinal direction (the x-direction) at which the flange portion 35 is curved, and the flange portion 35, as a whole, does not have a constant curvature radius. Further, the top wall portion 31 also includes a portion in the length in the longitudinal direction (the x-direction) at which the top wall portion 31 is curved, as with the flange portions 35.

The hot press-formed product to be formed by the die according to the present embodiment is not limited to a product having the shape shown in FIG. 2A or FIG. 2B. For example, the hot press-formed product may be a formed product in which the top wall portion and flange portions have flat shapes, as shown in FIG. 3A and FIG. 3B. FIG. 3B is a cross-sectional view along the line A-A' in FIG. 3A.

In FIG. 3A and FIG. 3B, the longitudinal direction of a hot press-formed product 40 is defined as the x-direction, and, of directions orthogonal to the x-direction, a direction of viewing from the vertical wall portion 43 side is defined as the y-direction, and a direction which is orthogonal to the x-direction and the y-direction, and which is the viewing direction from the top wall portion 41 side is defined as the z-direction.

The hot press-formed product 40 shown in FIG. 3A and FIG. 3B includes: two vertical wall portions 43; the top wall portion 41 which connects the two vertical wall portions 43 via first ridge portions 42; and flange portions 45 respectively connected to the two vertical wall portions 43 respectively via second ridge portions 44, at a side opposite to the top wall portion 41. When observed in a cross section (a transverse cross section, such as the cross section shown in FIG. 3B) in a direction orthogonal to the longitudinal direction (the x-direction), the hot press-formed product 40 has a shape in which each second ridge portion 44 has the same curvature radius value in any transverse cross section regardless of the position to be sectioned. Further, the hot press-formed product 40 has a shape with left-right symmetry in any transverse cross section regardless of the position to be sectioned.

Further, the hot press-formed product to be formed using the die according to the present embodiment is not limited to a product having a shape with left-right symmetry in a transverse cross section, such as that shown in FIG. 3A and FIG. 3B. For example, the hot press-formed product may be a formed product of which the shape of the left part and the shape of the right part in a transverse cross section are asymmetrical, such as that of a center pillar shown in FIG. 4A and FIG. 4B. FIG. 4B is a cross-sectional view along the line B-B' in FIG. 4A.

Figure 4A:
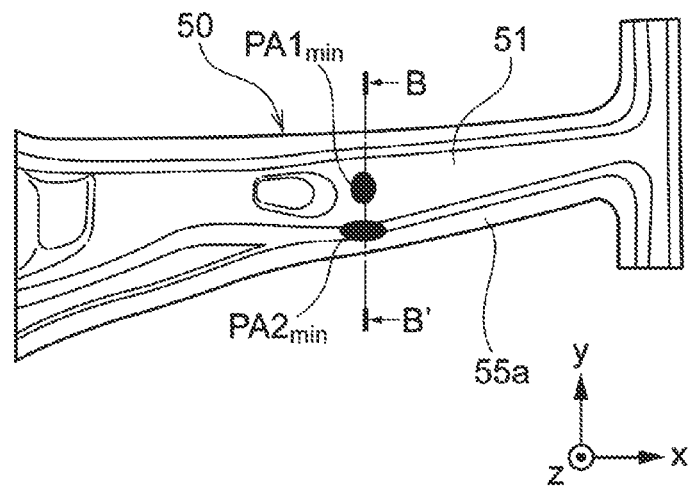
FIG. 4A is a schematic top view illustrating another example of a press-formed product obtained by the hot press forming according to the present embodiment.
Figure 4B:
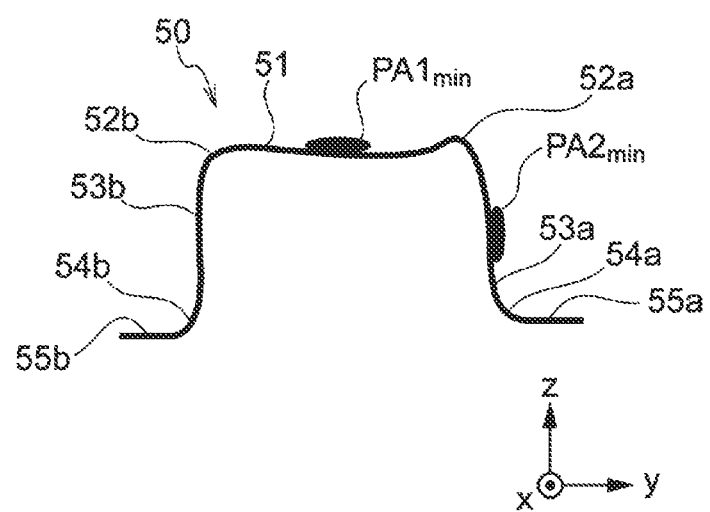
FIG. 4B is a cross-sectional view of the press-formed product shown in FIG. 4A.

In FIG. 4A and FIG. 4B, the longitudinal direction of a hot press-formed product 50 is defined as the x-direction, and, of directions orthogonal to the x-direction, a direction of viewing from the vertical wall portion 53a side is defined as the y-direction, and a direction which is orthogonal to the x-direction and the y-direction, and which is the viewing direction from the top wall portion 51 side is defined as the z-direction.

The hot press-formed product 50 shown in FIG. 4A and FIG. 4B includes: two vertical wall portions 53a and 53b; the top wall portion 51 which connects the two vertical wall portions 53a and 53b via first ridge portions 52a and 52b, respectively; and flange portions 55a and 55b respectively connected to the two vertical wall portions 53a and 53b via second ridge portions 54a and 54b, respectively, at a side opposite to the top wall portion 51. When a cross section (transverse cross section) orthogonal to the longitudinal direction (the x-direction) of the hot press-formed product 50 is observed, there are portions of which shapes do not have left-right symmetry. For example, in the transverse cross section shown in FIG. 4B, the heights in the z-direction of the two first ridge portions 52a and 52b present on both side of the flat top wall portion 51 are different, and the first ridge portion 52a on the right side protrudes higher in the z-direction than the first ridge portion 52b on the left side. Further, in the transverse cross section shown in FIG. 4B, the heights in the z-direction of the two flange portions 55a and 55b are also different, and the flange portion 55a on the right side is higher than the flange portion 55b on the left side. When observed in a transverse cross section, the hot press-formed product 50 has a shape in which the curvature radii of the second ridge portions 54a and 54b vary with the positions to be sectioned, and in which the curvature radius of the second ridge portion 54a in the transverse cross section shown in FIG. 4B is smallest.

In the forming of any of these hot press-formed products (for example, the hot press-formed product 30), as shown in FIG. 1, when a punch 13 having a flat top surface is pressed against a plated steel sheet 10 to be inserted into a die hole 11D in hot press forming, the plated steel sheet 10 is pressed to the inside of the die hole 11D. At this time, as a given position in the plated steel sheet 10 comes closer to the die hole 11D, the steel sheet at the position undergoes a shrink flange deformation, as a result of which the sheet thickness of the hot press-formed product 20 increases. In FIG. 1, a die 11 includes a hard layer 11C over the entirety of a region, adjacent to a die shoulder portion 11B, of a steel sheet contact surface 11A which is a surface that is located outside of the die hole 11D and configured to contact the plated steel sheet 10 that is to be subjected to the hot press forming.

When the hard layer 11C satisfies the above-described limitations concerning skewness (Rsk) and hardness Hv_Die, it is possible to reduce the occurrence of wear on the sliding surface of the die 11, which occurs at a high surface pressure portion during hot press forming of an Al-plated steel sheet.

Further, a holder (steel blank holder) 12 preferably includes a second hard layer 12C over the entirety of a region of a facing surface that faces the portion of the die 11 provided with the hard layer 11C, the facing surface facing the steel sheet contact surface 11A of the die 11.

When the second hard layer 12C satisfies the above-described skewness (Rsk) and hardness Hv_Die, it is possible to reduce the occurrence of wear on the sliding surface of the holder 12, which occurs at a high surface pressure portion during the hot press forming of the Al-plated steel sheet.

Further, from the viewpoint of reducing the wear of the die 11, the hard layer 11C is preferably formed over the entire circumference along the die shoulder portion 11B. However, in a case in which the region to be provided with the hard layer 11C is restricted from the viewpoint of cost and the like, the hard layer 11C may be formed at a portion that experiences a particularly high surface pressure.

From the viewpoint of reducing the wear of the holder 12, the second hard layer 12C is preferably formed over the entire circumference along a portion facing the die shoulder portion 11B of the die 11. However, in a case in which a region to be provided with the second hard layer 12C is restricted from the viewpoint of cost and the like, the second hard layer 12C may be formed at a portion that experiences a particularly high surface pressure.

Figure 5:
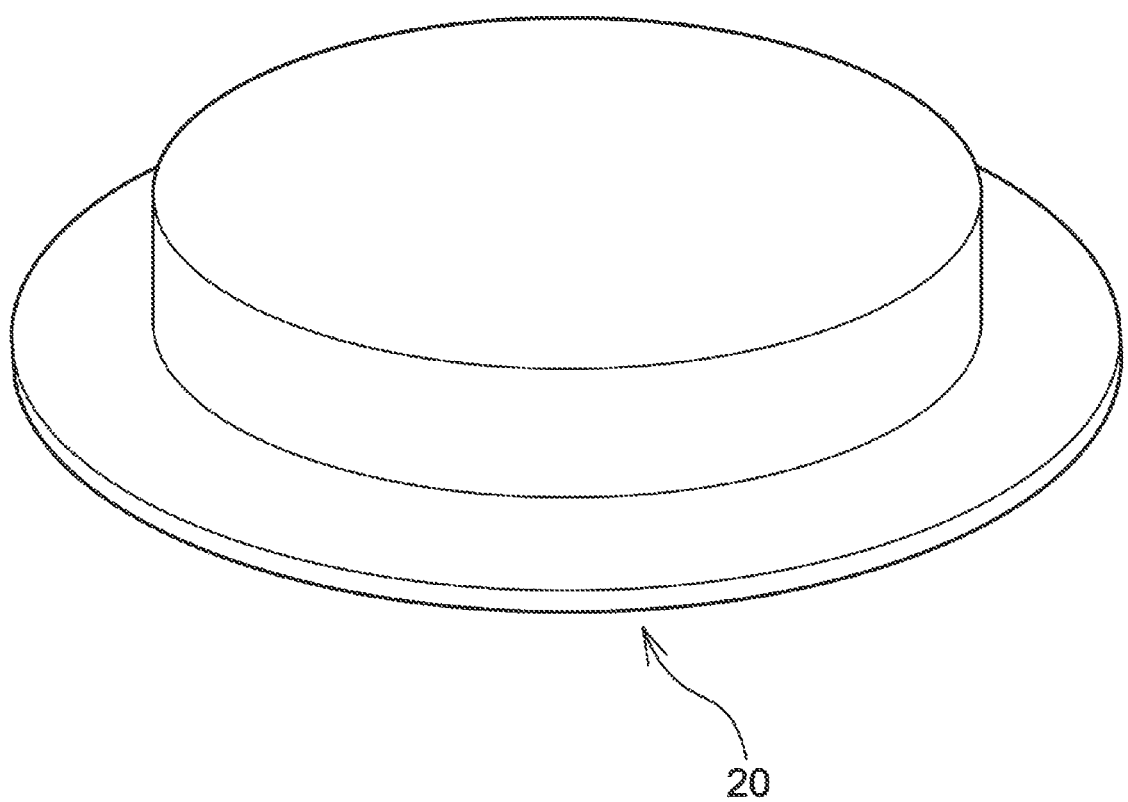
FIG. 5 is a schematic diagram illustrating one example of a formed product which can be obtained by the hot press forming shown in FIG. 1.

It is noted, in the present embodiment, that the shape of the hot press-formed product to be formed is not limited to the shapes shown in FIG. 2A and FIG. 2B, FIG. 3A and FIG. 3B, FIG. 4A and FIG. 4B, and the like. Press-formed products having a variety of other shapes, such as a press-formed product having a hat shape illustrated in FIG. 5, can be produced.

The occurrence of wear at a high surface pressure portion on the sliding surface of the die can be reduced by using, as a die to be used for the press forming, a die including a hard layer over the entirety of a region of the steel sheet contact surface that is adjacent to the die shoulder portion, the steel sheet contact surface being located outside of the die hole and configured to contact an Al-plated steel sheet that is to be subjected to the hot press forming, and the hard layer having a skewness (Rsk) as measured in a direction from the outside of the die hole toward the inside of the die hole within the above-specified range and a hardness Hv_Die within the above-specified range.

In the method of producing a hot press-formed product according to the present embodiment, hot press forming includes softening a plated steel sheet by heating the plated steel sheet to a high temperature, for example, after performing blanking (punching) if necessary. Thereafter, the softened plated steel sheet is formed by being stamped using the die, and then cooled. In the hot press forming, temporarily softening the plated steel sheet makes easier the subsequent stamping. Further, the press-formed product obtained by the hot press forming is quenched by heating and cooling, thereby becoming a formed product having a high tensile strength of about 1,500 MPa or more.

As the heating method for performing the hot press forming, it is possible to use a heating method using an ordinary electric furnace or a radiant tube furnace, or alternatively, a heating method employing an infrared heating, electric heating, induction heating or the like. The heating is performed under an oxidizing atmosphere.

—Die—

Next, the die to be used in the method of producing a hot press-formed product according to the present embodiment will be described in detail.

The application of the die according to the present embodiment is not particularly limited, and the die can be used, for example, as a die for performing hot press forming on an Al-plated steel sheet including a zinc compound layer or a metallic zinc layer, as an outermost surface layer, provided on the Al plating layer.

The die includes a hard layer having a skewness (Rsk), as measured in a direction from the outside of the die hole toward the inside of the die hole, of 1.3 or less, and a hardness Hv_Die of HV 2,000 or more, the hard layer being provided over the entirety of a region of a die shoulder adjacent surface that is adjacent to a die shoulder portion, the die shoulder adjacent surface being a surface that is located outside of the die hole and that is adjacent to the die shoulder portion.

When the die is used in the method of producing a hot press-formed product according to the present embodiment, the hard layer having a skewness (Rsk), as measured in a direction from the outside of the die hole toward the inside of the die hole, of 1.3 or less and a hardness Hv_Die of HV 2,000 or more is provided over the entirety of a region of the steel sheet contact surface that is adjacent to the die shoulder portion, the steel sheet contact surface being a surface that is located outside of the die hole and configured to contact an Al-plated steel sheet that is to be subjected to the hot press forming.

Skewness Rsk

When the hard layer included in the die has a skewness (Rsk), as measured in a direction from the outside of the die hole toward the inside of the die hole, of 1.3 or less, it is possible to reduce the occurrence of wear at a high surface pressure portion on the sliding surface of the die during the hot press forming.

The skewness (Rsk) of the hard layer is more preferably 1.0 or less, and still more preferably 0.8 or less.

Further, the lower limit value of the skewness (Rsk) of the hard layer is preferably −5.0 or more, and more preferably −3.0 or more, from the viewpoint of preventing an increase in the production cost due to surface control for reducing the skewness (Rsk). From the viewpoint of reducing adhesion to the die, the lower limit value of the skewness (Rsk) of the hard layer is preferably 0 or more.

The skewness (Rsk) of the hard layer is preferably within a range of from 0 to 1.3, more preferably from 0 to 1.0, and still more preferably from 0 to 0.8.

The skewness Rsk as used herein is measured in accordance with JIS B 0601 (2001). Specifically, the skewness Rsk is measured in accordance with JIS B 0601 (2001) under the following measurement conditions.

(Measurement Conditions)
  Measuring apparatus: a surface roughness/contour measuring apparatus "FORMTRACER", manufactured by Mitutoyo Corporation
  Measuring length L: 9.6 mm
  Cut-off wavelength λc: 0.8 mm
  Stylus tip shape: a cone with a tip angle of 60°
  Stylus tip radius: 2 μm
  Measuring speed: 1 mm/sec The method used for controlling the skewness (Rsk), as measured in a direction from the outside of the die hole toward the inside of the die hole, of the hard layer to the above-described range is not particularly limited. For example, a method including polishing the surface of the hard layer formed can be used, in which the polishing is performed in a direction from the outside of the die hole toward the inside of the die hole (namely, in the direction in which the plated steel sheet slides during the hot press forming). For example, in a case in which the polishing is performed by sliding a polishing sheet, the polishing may be performed by sliding the polishing sheet in the direction from the outside of the die hole toward the inside of the die hole.

Measuring the skewness (Rsk) over the entirety of a region adjacent to the die shoulder portion means measuring the skewness (Rsk) of the region adjacent to the die shoulder portion at a dense pitch of 20 mm or less.

Hardness Hv_Die

When the hard layer included in the die has a hardness Hv_Die of HV 2,000 or more, it is possible to reduce the occurrence of wear at a high surface pressure portion on the sliding surface of the die during hot press forming.

As will be described later, when the hard layer is a layer including a nitride layer, and a hard coating layer provided on the surface of the nitride layer, the hardness Hv_Die of the hard coating layer is preferably HV 3,200 or less. When the hardness Hv_Die is HV 3,200 or less, it is possible to reduce the scraping of the Al plating layer and the zinc compound layer or the metallic zinc layer in the Al-plated steel sheet, as well as to reduce the adhesion to the die.

In particular, when the hard coating layer is a layer including Cr, the hardness Hv_Die is preferably 3,200 or less.

When the hard coating layer is a layer including Ti, the hardness Hv_Die is more preferably HV 3,160 or less. When the hardness Hv_Die is HV 3,160 or less, it is possible to reduce the scraping of the Al plating layer and the zinc compound layer or the metallic zinc layer in the Al-plated steel sheet, as well as to reduce the adhesion to the die.

The hardness Hv_Die of the hard coating layer is more preferably from HV 2,500 to HV 3,000. When the hardness Hv_Die of the hard coating layer is from HV 2,500 to HV 3,000, the adhesion to the die can be reduced.

The hardness Hv_Die as used herein refers to "Vickers hardness" as defined in ITS-Z-2244 (2009), and, in the present specification, refers to a hardness value as measured in accordance with the Vickers hardness test method at a test load of 0.2452 N.

As a micro Vickers tester, HM-115 manufactured by Mitutoyo Corporation is used.

Formation of Hard Layer

In the present embodiment, the material of the hard layer provided on the die and the method used for forming the hard layer are not limited, as long as the hard layer satisfies the above-described limitations concerning the skewness Rsk and the hardness Hv_Die.

The hard layer may be, for example, a hard coating layer (vapor-deposition film) formed by a physical vapor deposition method (PVD method), and specific examples thereof include a nitride film, carbide film, or carbonitride film that includes one or more elements selected from the group consisting of Ti, Cr and Al as main components, and a diamond-like carbon (DLC) film.

Examples of the method used for forming a hard layer on the die in the present embodiment include a method of forming a vapor-deposition film by physical vapor deposition. The type of the physical vapor deposition method is not particularly limited. Alternatively, a chemical vapor deposition (CVD) method may be used. As the physical vapor deposition method, for example, an arc ion plating method or a sputtering method is desirable.

In particular, the vapor-deposition film as the hard coating layer is preferably a film including at least one of Ti or Cr. For example, the film is preferably formed from any one of a nitride, a carbide or a carbonitride, of which the metal element portion is mainly composed of one or more elements selected from Ti, Cr and Al. Further, the film is more preferably any of a nitride, a carbide or a carbonitride, of which the metal element portion is mainly composed of Ti or Cr.

With respect to "mainly composed of", it is preferable that Ti, Cr or Al (or alternatively, Ti or Cr) accounts for 70 (atomic %) or more, more preferably 90 (atomic %) or more (including substantially 100 (atomic %)), in metal components (including semimetals) from which nitrogen and carbon have been excluded.

For example, it is possible to form a PVD film on a surface of a base material of the die by using a reaction gas (such as $N_2$ gas or $CH_4$ gas) and any of various types of metallic targets as an evaporation source of a metal component or metal components, with application of a bias voltage at a regulated temperature and a regulated gas pressure.

Before forming the hard coating layer (vapor-deposition film) on the die by a physical vapor deposition method (PVD method), a nitride layer, which will serve as an underlying layer, is preferably formed (by a surface hardening treatment using diffusion, such as a nitriding treatment).

The formation of the nitride layer is performed by subjecting the base material of the die, for example, to an ion nitriding treatment, more specifically, an ion nitriding treatment in a gas atmosphere of $N_2$ and $H_2$ with predetermined concentrations at a controlled temperature.

In this process, a compound layer that may be generated in the nitriding treatment, such as a nitride layer referred to as a "white layer", lowers the adhesion property. Therefore, it is desirable to avoid the formation of the compound layer by controlling treatment conditions, or to remove the compound layer, for example, by polishing.

Base Material

The metallic material of the base material of the die is not particularly limited, and it is possible to use a known metallic material, such as a cold working die steel, a hot working die steel, a high-speed steel, or a cemented carbide. As for the metallic material, it is also possible to use any of improved metal grades which have been proposed as steel grades which can be used in conventional dies, including standard metal grades (steel grades) defined, for example, in JIS.

—Die Set—

Next, a die set to be used in the method of producing a hot press-formed product according to the present embodiment will be described in detail. The die set as used herein may refer to a combination of: a die; and a punch having a protruding portion corresponding to a die hole of the die, and a facing surface that faces the steel sheet contact surface (die shoulder adjacent surface) of the die. Further, the die set may alternatively refer to a combination of: a die; and a steel blank holder (holder) having a facing surface that faces the steel sheet contact surface (die shoulder adjacent surface) of the die, and a hole through which a punch to be inserted into a die hole passes.

A first die set according to the present embodiment includes the above-described die according to the present embodiment, and a punch.

The punch includes a second hard layer having a skewness (Rsk), as measured in a direction from the outside of a punch portion toward the inside of the punch portion, of 1.3 or less, and a hardness Hv_Die of HV 2,000 or more, the second hard layer being provided over the entirety of a region of the facing surface that faces a portion of the die provided with the hard layer, the facing surface facing the die shoulder adjacent surface (steel sheet contact surface) of the die.

Figure 6:
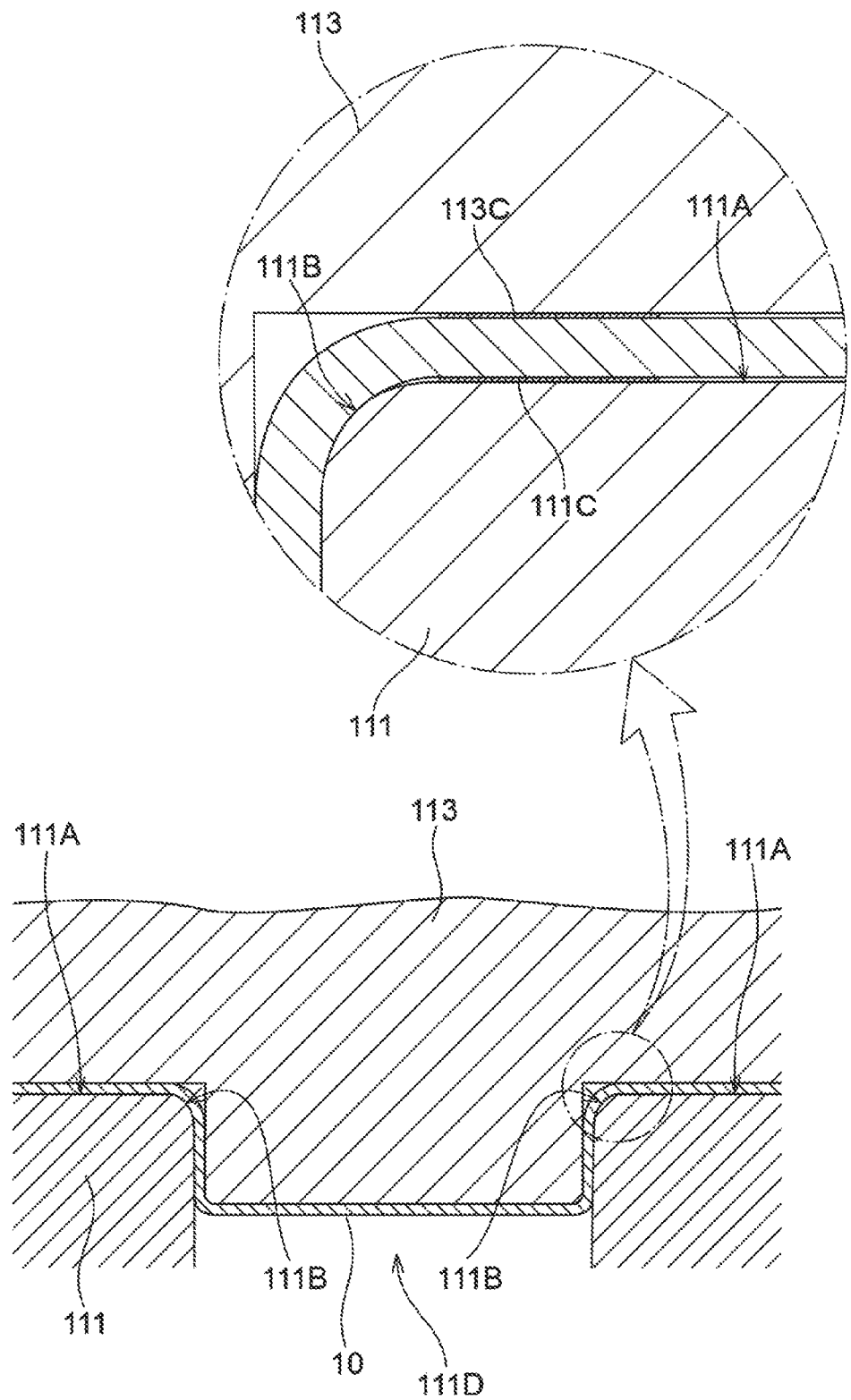
FIG. 6 is a schematic diagram illustrating one example of a plated steel sheet that is being subjected to hot press forming using a die and a punch.

For example, a die 111 shown in FIG. 6 includes a hard layer 111C over the entirety of a region, adjacent to a die shoulder portion 111B, of a steel sheet contact surface 111A, the steel sheet contact surface 111A being a surface that is located outside a die hole 111D and configured to contact the plated steel sheet 10 that is to be subjected to hot press forming. Further, a punch 113 preferably includes a second hard layer 113C over the entirety of a region of the facing surface that faces the portion of the die 111 provided with the hard layer 111C, the facing surface facing the steel sheet contact surface 111A of the die 111. This is because a wrinkled portion of the plated steel sheet 10 comes into contact with the portion provided with the second hard layer 113C when the punch 113 has moved to a position close to the bottom dead center in the forming.

A second die set according to the present embodiment includes: the above-described die according to the present embodiment; and a steel blank holder.

The steel blank holder includes a second hard layer having a skewness (Rsk), as measured in a direction from the outside of a punch-insertion portion toward the inside of the punch-insertion portion, of 1.3 or less, and a hardness Hv_Die of HV 2,000 or more, over the entirety of a region of a facing surface that faces the portion of the die provided with the hard layer, the facing surface facing the die shoulder adjacent surface (steel sheet contact surface) of the die.

As previously described, the holder (steel blank holder) 12 shown, for example, in FIG. 1 preferably includes the second hard layer 12C over the entirety of a region of a facing surface that faces the portion of the die 11 provided with the hard layer 11C, the facing surface facing the steel sheet contact surface 11A of the die 11.

The above-described preferable embodiments described for the hard layer included in the die according to the present embodiment apply as-is as preferable embodiments of the second hard layer in the punch included in the first die set according to the present embodiment, and preferable embodiments of the second hard layer in the steel blank holder included in the second die set according to the present embodiment.

Next, the Al-plated steel sheet used in the method of producing a hot press-formed product according to the present embodiment will be described in detail.

(Plated Steel Sheet)

The Al-plated steel sheet includes a zinc compound layer or a metallic zinc layer, as an outermost surface layer, provided on an Al plating layer.

Figure 7:
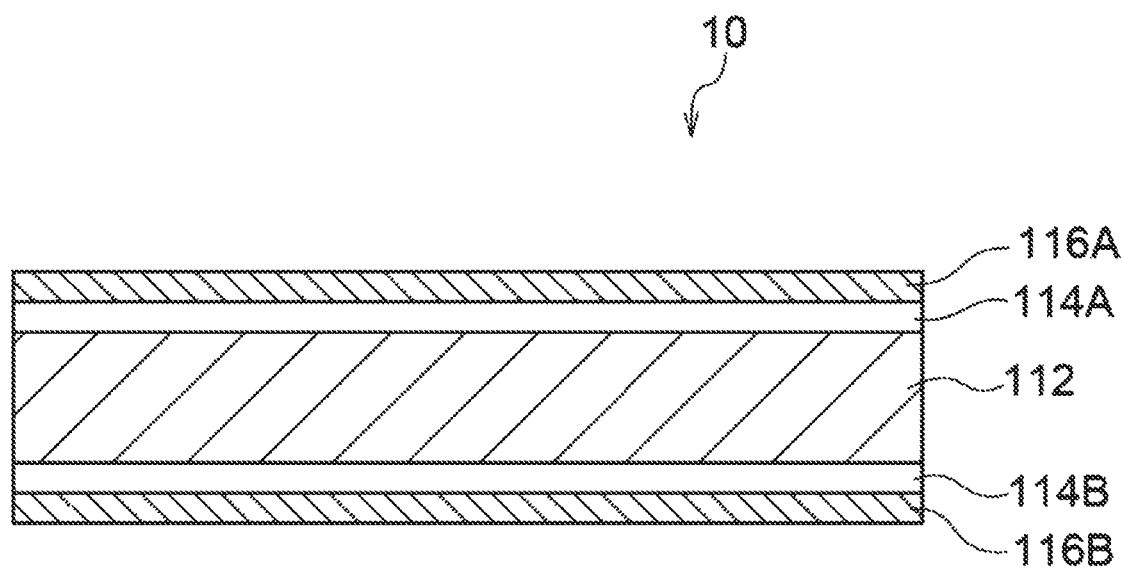
FIG. 7 is a schematic cross-sectional view illustrating one example of an Al-plated steel sheet used in the present embodiment.

The Al-plated steel sheet, for example, includes: aluminum plating layers 114A and 114B provided on respective surfaces (upper surface and lower surface) of a steel sheet 112; and zinc compound layers or metallic zinc layers 116A and 116B, as outermost surface layers, provided on the aluminum plating layers 114A and 114B, respectively, as in the plated steel sheet 10 shown in FIG. 7.

A steel sheet to be provided with plating (a steel sheet before plating) is preferably a steel sheet having, for example, a high mechanical strength (the mechanical strength refers to various properties related to mechanical deformation and fracture, such as tensile strength, yield point, elongation, drawing, hardness, impact value, fatigue strength, and creep strength). An example of a steel sheet (steel sheet before plating) achieving a high mechanical strength and used in the plated steel sheet according to the present embodiment is described below.

It is noted that the mark "%" refers to "% by mass", unless otherwise specified. Further, in the present specification, any numerical range described using "to" refers to a range in which numerical values described before and after the "to" are included as the minimum value and the maximum value of the range.

The steel sheet preferably includes, in % by mass, at least one or more of: from 0.01 to 0.6% of C; from 0.01 to 0.6% of Si; from 0.5 to 3% of Mn; from 0.01 to 0.1% of Ti; and from 0.0001 to 0.1% of B; and a balance consisting of Fe and impurities.

C is included for the purpose of ensuring a desired mechanical strength. When the C content is less than 0.01%, a sufficient improvement in the mechanical strength cannot be obtained, and the effect of including C is reduced. When the C content is more than 0.6%, the steel sheet can be further hardened, but becomes more susceptible to melt cracking. Accordingly, the C content is preferably from 0.01% to 0.6%.

Si is one of strength-improving elements which improve the mechanical strength, and is included for the purpose of ensuring a desired mechanical strength, as with the case of C. When the Si content is less than 0.01%, it is difficult to obtain the effect of improving strength, and fails to obtain a sufficient improvement in the mechanical strength. Si is also an oxidizable element. Therefore, when the Si content is more than 0.6%, the wettability may be decreased when performing hot-dip aluminum plating, possibly resulting in a plating failure. Accordingly, the Si content is preferably from 0.01% to 0.6%.

Mn is one of strengthening elements which strengthen the steel, and also one of the elements which enhance hardenability. Further, Mn is also effective for preventing hot brittleness caused by S, which is one of the impurities. When the Mn content is less than 0.5%, the above-described effects cannot be obtained. When the Mn content is 0.5% or more, these effects can be obtained. However, when the Mn content is more than 3%, the amount of residual γ-phase may excessively increase, which may result in a decrease in the strength. Accordingly, the Mn content is preferably from 0.5% to 3%.

Ti is one of the strengthening elements, and also improves heat resistance of the Al plating layer. When the Ti content is less than 0.01%, the effects in terms of improving the strength and oxidation resistance cannot be obtained. When the Ti content is 0.01% or more, these effects can be obtained. However, the inclusion of an excessive amount of Ti may result, for example, in formation of carbides or nitrides, which may soften the steel. When the Ti content is more than 0.1%, in particular, a desired mechanical strength is unlikely to be obtained. Accordingly, the Ti content is preferably from 0.01% to 0.1%.

B has the effect in terms of improving the strength by acting during quenching. When the B content is less than 0.0001%, the effect in terms of improving the strength is low. When the B content is more than 0.1%, inclusions may be formed and cause embrittlement, which may decrease the fatigue strength. Accordingly, the B content is preferably from 0.0001% to 0.1% or less.

The steel sheet may include impurities which are inevitably incorporated, for example, during production processes.

The steel sheet formed of the above-described chemical components can be made to have a mechanical strength of about 1,500 MPa or more, by being quenched from heating during the hot press forming or the like. Even though the steel sheet has a high mechanical strength as described above, the steel sheet can be easily formed by hot press forming; this is because the steel sheet can be hot stamped in a softened state achieved by heating. The steel sheet is capable of realizing a high mechanical strength, and, in addition, capable of maintaining or improving the mechanical strength even with a thickness reduced for the purpose of weight reduction.

(Al Plating Layer)

The Al plating layer will be described.

The component composition of the Al plating layer includes 50% or more of Al. The elements other than Al are not particularly limited. However, Si may be actively included because of the following reasons.

When Si is included in the Al plating layer, an Al—Fe—Si alloy layer is formed at an interface between the plating and a base metal, thereby enabling reduction in the formation of a brittle Al—Fe alloy layer during hot-dip plating. When the Si content is less than 3%, an Al—Fe alloy layer grows and becomes thick at a stage of performing aluminum plating, and the thick Al—Fe alloy layer may accelerate cracking of the plating layer during working, and adversely affect the corrosion resistance. When the Si content is more than 15%, the volume fraction of the layer including Si increases, which may deteriorate the workability and corrosion resistance of the plating layer. Accordingly, the Si content in the Al plating layer is preferably within a range of from 3 to 15%.

The Al plating layer prevents the corrosion of the steel sheet. Further, when the plated steel sheet is processed by hot press forming, generation of scales (oxides of iron) due to oxidation of a surface does not occur on the Al plating layer even when the Al plating layer is heated to a high temperature. When the generation of scales is prevented by the presence of the Al plating layer, a scale removal step, a surface cleaning step, a surface treatment step and the like can be omitted, as a result of which the efficiency in production of formed products can be improved. Further, the Al plating layer has a high boiling point and a high melting point, as compared those of plating layers formed from organic materials or plating layers formed from other metal-based materials (such as Zn-based materials). Therefore, the Al plating layer is less likely to evaporate during hot press forming, and, therefore, hot press forming at high temperatures is enabled. This further improves formability in hot press forming, and enables the forming to be performed more easily.

There is a case in which a very thin (for example, 0.1 μm-thick) Al oxide film is present on the surface of the Al plating layer. In this case, the Al oxide film is regarded as absent. This is because the Al oxide film already present before hot press forming does not have any particular effect on the hot press forming or the hot press-formed product.

The Al plating layer may form an alloy with Fe in the steel sheet when heated in hot-dip plating and hot press forming. Therefore, the Al plating layer is not necessarily formed as a single layer having a uniform component composition, and includes an alloyed layer (alloy layer) in some parts.

The deposited amount of the Al plating layer is preferably from 20 to 100 $g/m^2$ in terms of Al amount. When the deposited amount of the Al plating layer is adjusted to 20 $g/m^2$ or more, a suitable amount of aluminum adhesion is allowed to adhere to the sliding surface of the die, and the effect in terms of reducing the wear on the sliding surface of the die can be enhanced. Further, the corrosion resistance of the press-formed product can also be improved. When the deposited amount of the Al plating layer is adjusted to more than 100 $g/m^2$, a large amount of aluminum adhesion adheres to the sliding surface of the die, and increases the tendency toward occurrence of wear on the sliding surface of the die.

The deposited amount of the Al plating layer is evaluated by the deposited amount in terms of Al. The deposited amount of the Al plating layer is measured using an X-ray fluorescence method. Specifically, a calibration curve is prepared using several kinds of standard samples each having an Al plating layer in a known deposited amount (in terms of Al amount), by the X-ray fluorescence method. Thereafter, the Al intensity of a sample to be measured is converted to the deposited amount of the Al plating layer, based on the calibration curve, to determine the deposited amount of the Al plating layer.

(Zinc (Zn) Compound Layer or Metallic Zinc (Zn) Layer)

A Zn compound layer or a metallic Zn layer is a ZnO film, or is a layer which becomes a ZnO film during hot press forming. Before being subjected to hot press forming, the plated steel sheet is heated in an oxidizing atmosphere. At this time, a Zn compound layer other than a ZnO film or a metallic Zn layer is oxidized to form a ZnO film. The type of the Zn compound layer other than a ZnO film or of the metallic Zn layer is not particularly limited, as long as the layer forms a ZnO film by being oxidized. Examples of the Zn compound layer other than a ZnO film include a zinc phosphate layer and a Zn-based metallic soap layer. Further, a Zn compound or metallic Zn may be mixed with a resin that burns and disappears when heated, and used as a Zn compound layer other than a ZnO film or a metallic Zn layer. The amount of Zn included in the Zn compound layer or the metallic Zn layer is adjusted in accordance with the deposited amount of the ZnO film in a desired product.

(ZnO Film)

The ZnO film is a film which forms a surface that comes into contact with the die and which will form the outer surface of the press-formed product.

The method used for forming the ZnO film is not particularly limited, and the ZnO film can be formed on the Al plating layer, for example, by a method disclosed in Patent Document 1 or 2.

The deposited amount of the ZnO film is preferably adjusted within the range of from 0.4 to 4.0 $g/m^2$ in terms of Zn amount, from the viewpoint of the corrosion resistance of the product. When the deposited amount of the ZnO film is adjusted to 0.4 g/m² or more in terms of Zn amount, the corrosion resistance of the resulting press-formed product is improved. When the deposited amount of the ZnO film is adjusted to more than 4.0 g/m² in terms of Zn amount, the total thickness of the Al plating layer and the ZnO film becomes too large, which may deteriorate weldability and paint adhesion. The deposited amount of the ZnO film is more preferably from 0.4 to 2.0 g/m² in terms of Zn amount. When the deposited amount of the Al plating layer is low, the deposited amount of the ZnO film is preferably adjusted to a larger value within the above-described range, from the viewpoint of wear of the die.

The deposited amount of the ZnO film is measured using the X-ray fluorescence method. Specifically, a calibration curve is prepared using several kinds of standard samples each having a ZnO film in a known deposited amount (in terms of Zn amount), by the X-ray fluorescence method. Thereafter, the Zn intensity of a sample to be measured is converted to the deposited amount of the ZnO film, based on the calibration curve, to determine the deposited amount of the ZnO film.

(Press-Formed Product)

Next, the press-formed product according to the present embodiment will be described in detail.

The press-formed product according to the present embodiment includes: a steel base material; an alloyed hot-dip zinc plating (Al plating) layer provided on the steel base material; and a zinc oxide (ZnO) layer, as an outermost surface layer, provided on the Al plating layer.

The zinc oxide (ZnO) layer, as an outermost surface layer, is formed by heating carried out during hot press forming of the Al-plated steel sheet.

The steel base material (steel sheet) has a hardness Hv_Parts of HV 400 or more, preferably HV 450 or more, and more preferably HV 550 or more, from the viewpoint of obtaining high mechanical strength.

Further, the press-formed product according to the present embodiment includes: a top wall portion; a vertical wall portion connected to the top wall portion via a first ridge portion; and a flange portion connected to the vertical wall portion via a second ridge portion. The press-formed product according to the present embodiment is, for example, the hot press-formed product 40 which has the shape shown in FIG. 3A and FIG. 3B having a hat-shaped cross section with a flat top wall portion, or the hot press-formed product 30 which has the shape shown in FIG. 2A and FIG. 2B.

—Press-Formed Product According to First Aspect—

First, a press-formed product according to the first aspect is described which is a press-formed product including the portion $PB0_{min}$ at which the curvature radius of the flange portion is smallest, when observed from the side surface side. The formed product shown in FIG. 2A and FIG. 2B is one example of the press-formed product according to the first aspect.

The hot press-formed product 30 shown in FIG. 2A and FIG. 2B includes: two vertical wall portions 33; the top wall portion 31 which connects the two vertical wall portions 33 via the first ridge portions 32; and the flange portions 35 respectively connected to the two vertical wall portions 33 respectively via the second ridge portions 34, at a side opposite to the top wall portion 31. The top wall portion 31 is a portion which corresponds to the top surface of the punch in hot press forming, the vertical wall portions 33 are portions which slide against the punch and the die, and the flange portions 35 are portions which are not formed at the time of hot press forming. The first ridge portions 32 are curved portions connecting the top wall portion 31 and the vertical wall portions 33, and the second ridge portions 34 are curved portions respectively connecting the vertical wall portions 33 and the flange portions 35.

When the hot press-formed product 30 is observed from the side surface side, namely, observed from the y-direction as shown in FIG. 2B, each of the top wall portion 31, the vertical wall portion 33 and the flange portion 35 is curved at a part thereof, and the hot press-formed product 30 has a shape of which a part is bulging in the direction toward the outer side of the top wall portion 31. Therefore, the flange portion 35 at the bulging portion includes the portion $PB0_{min}$ at which the curvature radius is smallest (namely, the portion having the largest curvature). When observed from the side surface side, the flange portion 35, as a whole, does not have a constant curvature radius, and the top wall portion 31 as a whole, also does not have a constant curvature radius.

Curvature Radius at Second Ridge Portion (First Aspect)

In the press-formed product according to the first aspect, the portion of the second ridge portion 34 at which the curvature radius is smallest (namely, the portion having the largest curvature) has a curvature radius $[R_{min}]$ of from 3 mm to less than 10 mm. That the minimum curvature radius $[R_{min}]$ at the second ridge portion 34 is less than 10 indicates that, when the press-formed product 30 is produced by performing hot press forming on an Al-plated steel sheet, the portion which will become the vertical wall portion 33 undergoes a high surface pressure. Therefore, it can be said that this press-formed product has been subjected to hot press forming under conditions in which the vertical wall portion 33 experiencing a high surface pressure is susceptible to scratches due to sliding. When the upper limit value of the minimum curvature radius $[R_{min}]$ at the second ridge portion 34 is 8 mm or less, it can be said that the vertical wall portion 33 is more susceptible to scratches due to sliding.

The lower limit value of the minimum curvature radius $[R_{min}]$ at the second ridge portion 34 is 3 mm or more, and preferably 4 mm or more, from the viewpoint of preventing cracks during press forming.

The curvature radius as used herein is measured as follows. First, the three-dimensional shape of the outer surfaces of the second ridge portions 34, namely, the three-dimensional shape of the surfaces which have contacted the die during the hot press forming, is measured by a three-dimensional shape measuring apparatus. Thereafter, the curvature radius $[R_{min}]$ at the portion at which the curvature radius in a transverse cross section is smallest is determined.

Difference in Smoothness Between Top Wall Portion and Vertical Wall Portion (First Aspect)

In the press-formed product according to the first aspect, there is a difference in smoothness between the top wall portion 31 and the vertical wall portion 33. Specifically, a smoothness [SaB1] of the top wall portion 31 is measured at a central portion $PB1_{min}$. The central portion $PB1_{min}$ is a portion corresponding to the portion $PB0_{min}$ at which the curvature radius of the flange portion 35 observed from the side surface side (namely, observed from the y-direction as shown in FIG. 2B) is smallest (in other words, the central portion $PB1_{min}$ is a portion on the top wall portion 31 that can be reached only by shifting in the z-direction without any shift in the x-direction, from the portion $PB0_{min}$ on the flange portion 35, when observed from the y-direction as shown in FIG. 2B), and the central portion $PB1_{min}$ is also a central portion in the width direction (namely, the y-direction) of the top wall portion 31. Further, a smoothness [SaB2] of the vertical wall portion 33 is measured at a central portion $PB2_{min}$. The central portion $PB2_{min}$ is a portion corresponding to the portion $PB0_{min}$ when observed from the side surface side (namely, the central portion $PB2_{min}$ is a portion on the vertical wall portion 33 that can be reached only by shifting in the z-direction without any shift in the x-direction, from the portion $PB0_{min}$ on the flange portion 35, when observed from the y-direction as shown in FIG. 2B), and the central portion $PB2_{min}$ is also a central portion in the height direction (namely, the z-direction) of the vertical wall portion 33. The smoothness at the portion $PB1_{min}$ and the smoothness at the portion $PB2_{min}$ are both measured on the outer surfaces, namely, the surfaces which have contacted the die during the hot press forming.

The difference [SaB1−SaB2] is 0.30 μm or more.

A difference [SaB1−SaB2] in smoothness between the top wall portion 31 and the vertical wall portion 33 within this range indicates that, when the press-formed product 30 was produced by performing hot press forming on an Al-plated steel sheet, a portion of the steel sheet which would become the vertical wall portion 33 experienced a high surface pressure, as compared to the portion which would become the top wall portion 31. This is because sliding of the vertical wall portion 33 against the die with a high surface pressure causes the surface of the vertical wall portion 33 to become smoother than the surface of the top wall portion 31. Therefore, it can be said that this press-formed product was formed by hot press forming under conditions such that the vertical wall portion 33 to which a high surface pressure is applied is susceptible to scratches due to sliding. When the difference [SaB1−SaB2] in the smoothness is 0.35 μm or more, it can be said that the press-formed product has been formed under conditions in which the vertical wall portion 33 is more susceptible to scratches due to sliding.

The maximum value of the difference [SaB1−SaB2] in the smoothness is more preferably 2.0 μm or less, from the viewpoint of sharpness after painting.

Each of the smoothnesses [SaB1] and [SaB2] refers to an arithmetic mean height Sa (unit: μm) defined in ISO 25178-2 (2012). The measuring apparatus, the measurement conditions and the like are as follows.

Measuring apparatus: a shape analysis laser microscope VK-X 250/150 manufactured by Keyence Corporation Measurement region: a 5 mm×5 mm region with the central point of $PB1_{min}$ or $PB2_{min}$ located at the center of the measurement region Measurement conditions: Gaussian filter was used S filter: not used L filter: 4 mm Difference in Surface Texture Aspect Ratio Between Top Wall Portion and Vertical Wall Portion (First Aspect)

In the press-formed product according to the first aspect, the difference in the surface texture aspect ratio between the top wall portion 31 and each vertical wall portion 33 is small. Specifically, the surface texture aspect ratios of the top wall portion 31 and the vertical wall portion 33 are measured at the portion $PB1_{min}$ and at the portion $PB2_{min}$, respectively, to obtain a surface texture aspect ratio [StrB1] and a surface texture aspect ratio [StrB2], respectively, as with the measurement of the smoothness. As with the measurement of the smoothness, each of the surface texture aspect ratios is measured on the outer surface, namely, the surface which has contacted the die during the hot press forming.

The difference [StrB1−StrB2] is 0.50 or less.

A smaller difference [StrB1−StrB2] in the surface texture aspect ratio between the top wall portion 31 and the vertical wall portion 33 indicates that the occurrence of scratches due to sliding is reduced in the vertical wall portion 33 in the press-formed product, even though the portion which would become the vertical wall portion 33 experienced a high surface pressure during the hot press forming, as compared to the portion which would become the top wall portion 31. When scratches due to sliding significantly have occurred at a given portion, the surface texture aspect ratio Str at the portion decreases because the scratches are in the form of streaks. Further, the portion at which the scratches have occurred forms a glossy part before painting. After painting, since a difference in glossiness is generated, the scratched portion appears like a pattern when visually observed, resulting in poor surface quality. In contrast, by regulating the difference [StrB1−StrB2] in the surface texture aspect ratio to be small, it is possible to obtain a press-formed product according to the first aspect in which the difference in glossiness after painting is 25 or less, and the press-formed product has excellent surface quality.

In a press-formed product formed using a high-hardness steel base material having a hardness Hv_Parts of HV 400 or more, delayed fracture is more likely to occur due to hydrogen embrittlement or the like, particularly at a portion at which stress is concentrated during the press forming. However, in the press-formed product according to the first aspect, it can be said that the concentration of stress to the vertical wall portion 33 is also reduced, because the occurrence of scratches in the vertical wall portion 33 is reduced as described above. Accordingly, delayed fracture, which tends to occur at a stress-concentrated portion, is also reduced.

Further, the difference [StrB1−StrB2] in the surface texture aspect ratio is preferably 0.50 or less, and more preferably 0.40 or less, from the viewpoint of obtaining excellent surface quality and reducing delayed fracture.

Each of the surface texture aspect ratios [StrB1] and [StrB2] refers to the surface texture aspect ratio "Str" defined in ISO 25178-2 (2012). The measuring apparatus, the measurement conditions and the like are as follows.

Measuring apparatus: a shape analysis laser microscope VK-X 250/150 manufactured by Keyence Corporation Measurement region: a 5 mm×5 mm region with the central point of $PB1_{min}$ or $PB2_{min}$ located at the center of the measurement region Measurement conditions: Gaussian filter was used S filter: not used L filter: 4 mm The method used for adjusting the difference [StrB1−StrB2] in surface texture aspect ratio between the top wall portion 31 and the vertical wall portion 33 within the above-described range is not particularly limited, and may be a method in which a press-formed product is formed by the above-described method of producing a hot press-formed product according to the present embodiment.

When a press-formed product is formed using the method of producing a hot press-formed product according to the present embodiment, adhesion to the die can be reduced. A large amount of adhesion causes an increase in the friction coefficient, making scratches due to sliding more likely to occur. However, when the amount of adhesion is reduced as described above, an increase in the friction coefficient is also curbed, and the occurrence of scratches due to sliding in the vertical wall portion 33 is reduced. It is conceivable that the difference [Str1−Str2] in the surface texture aspect ratio can be controlled within the above-described range due to the above mechanism.

—Press-Formed Product According to Second Aspect—

Next, a press-formed product according to the second aspect will be described. The formed products shown in FIG.

3A and FIG. 3B as well as in FIG. 4A and FIG. 4B are examples of the press-formed product according to the second aspect.

The hot press-formed product 40 shown in FIG. 3A and FIG. 3B includes: two vertical wall portions 43; the flat top wall portion 41 which connects the two vertical wall portions 43 via first ridge portions 42; and the flange portions 45 respectively connected to the two vertical wall portions 43 respectively via the second ridge portions 44, at a side opposite to the top wall portion 41. The top wall portion 41 is a portion which corresponds to the top surface of the punch in hot press forming, the vertical wall portions 43 are portions which slide against the punch and the die, and the flange portions 45 are portions which are not formed at the time of hot press forming. The first ridge portions 42 are curved portions connecting the top wall portion 41 and the vertical wall portions 43, and the second ridge portions 44 are curved portions respectively connecting the vertical wall portions 43 and the flange portions 45.

When the hot press-formed product 40 is observed from the side surface side, namely, observed from the y-direction as shown in FIG. 3A, all of the top wall portion 41, the vertical wall portion 43 and the flange portion 45 are flat. This hot press-formed product 40 has a shape having left-right symmetry in any transverse cross section regardless of the position to be sectioned, when a cross section (transverse cross section, such as the cross section shown in FIG. 3B) of the hot press-formed product 40 orthogonal to the longitudinal direction (the x-direction) is observed. Further, the hot press-formed product 40 has a shape such that each second ridge portion 44 has the same curvature radius value in any transverse cross section regardless of the position to be sectioned. In other words, each second ridge portion 44 has a constant curvature radius in any transverse cross section regardless of the position to be sectioned. To put it in another way, the curvature radius of each second ridge portion 44 is the minimum value, in any transverse cross section regardless of the position to be sectioned.

The hot press-formed product 50 shown in FIG. 4A and FIG. 4B is a center pillar for use in an automobile, and includes: two vertical wall portions 53a and 53b; the flat top wall portion 51 which connects the two vertical wall portions 53a and 53b via the first ridge portions 52a and 52b, respectively; the flange portions 55a and 55b connected to the two vertical wall portions 53a and 53b via the second ridge portions 54a and 54b, respectively, at a side opposite to the top wall portion 51. The top wall portion 51 is a portion which corresponds to the top surface of the punch in hot press forming, the vertical wall portions 53a and 53b are portions which slide against the punch and the die, and the flange portions 55a and 55b are portions which are not formed at the time of hot press forming. The first ridge portions 52a and 52b are curved portions connecting the top wall portion 51 and the vertical wall portions 53a and 53b, respectively, and the second ridge portions 54a and 54b are curved portions connecting the vertical wall portions 53a and 53b and the flange portions 55a and 55b, respectively. The hot press-formed product 50 includes a portion of which cross section (transverse cross section) orthogonal to the longitudinal direction (the x-direction) has a shape that does not have left-right symmetry. For example, in the transverse cross section shown in FIG. 4B, the heights in the z-direction of the two first ridge portions 52a and 52b present at respective sides of the flat top wall portion 51 are different, and the first ridge portion 52a on the right side bulges higher in the z-direction than the first ridge portion 52b on the left side. Further, in the transverse cross section shown in FIG. 4B, the heights in the z-direction of the two flange portions 55a and 55b are also different, and the flange portion 55a at the right side is higher than the flange portion 55b at the left side. The hot press-formed product 50 has a shape such that curvature radii of the second ridge portions 54a and 54b in a transverse cross section vary with the position to be sectioned, and such that the curvature radius of the second ridge portion 54a is smallest at the transverse cross section shown in FIG. 4B (cross section along the line B-B' in FIG. 4A).

Curvature Radius at Second Ridge Portion (Second Aspect)

In the press-formed product according to the second aspect, the portion of the second ridge portion 44, 54a or 54b at which the curvature radius is smallest (namely, the portion having the largest curvature) has a curvature radius $[R_{min}]$ of from 3 mm to less than 10 mm. That the minimum curvature radius $[R_{min}]$ at the second ridge portion 44, 54a or 54b is less than 10 indicates that, when the press-formed product 40 or 50 is produced by performing hot press forming on an Al-plated steel sheet, the portion which will become the vertical wall portion 43, 53a or 53b undergoes a high surface pressure. Therefore, it can be said that this press-formed product has been subjected to hot press forming under conditions in which the vertical wall portion 43, 53a or 53b experiencing a high surface pressure is susceptible to scratches due to sliding. When the upper limit value of the minimum curvature radius $[R_{min}]$ at the second ridge portion 44, 54a or 54b is 8 mm or less, it can be said that the vertical wall portion 43, 53a or 53b is more susceptible to scratches due to sliding.

The lower limit value of the minimum curvature radius $[R_{min}]$ at the second ridge portion 44, 54a or 54b is 3 mm or more, and preferably 4 mm or more, from the viewpoint of preventing cracks during press forming.

The curvature radius is measured in accordance with the method used for measuring the curvature radius of the second ridge portion in the above-described first aspect.

Difference in Smoothness Between Top Wall Portion and Vertical Wall Portion (Second Aspect)

In the press-formed product according to the second aspect, there is a difference in smoothness between the top wall portion and the vertical wall portion. Specifically, when a cross section (transverse cross section) of the press-formed product in a direction orthogonal to the longitudinal direction (the x-direction) is observed, a transverse cross section at which the curvature radius of the second ridge portion is smallest is selected as the cross section to be measured. In other words, in the case of the press-formed product 40 shown in FIG. 3A and FIG. 3B, the curvature radius of each second ridge portion 44 is the minimum value, in any transverse cross section regardless of the position to be sectioned, and, therefore, any transverse cross section may be used as the cross section to be measured. Preferably, it is recommended to use the transverse cross section at a central position in the longitudinal direction (the x-direction). In the case of the press-formed product 50 shown in FIG. 4A and FIG. 4B, the curvature radius of the second ridge portion 54a is smallest in the transverse cross section shown in FIG. 4B (the cross section along the line B-B' in FIG. 4A), and thus the transverse cross section shown in FIG. 4B is used as the cross section to be measured. Thereafter, in the thus selected transverse cross section at which the curvature radius is smallest, a smoothness [SaA1] is measured at a central portion PA1 min, which is the central portion in the cross-sectional width direction of the top wall portion (41 or 51) (for example, in FIG. 3B, the smoothness is measured at the portion corresponding to a midpoint (W/2) of a length W in the y-direction of the top wall portion 41).

Also for the vertical wall portion, a transverse cross section at which the curvature radius of the second ridge portion is smallest when cross sections (transverse cross sections) in a direction orthogonal to the longitudinal direction (the x-direction) of the press-formed product are observed, is selected as the cross section to be measured. Thereafter, in the thus selected transverse cross section at which the curvature radius is smallest, a smoothness [SaA2] is measured at a central portion $PA2_{min}$, which is the central portion in the cross-sectional height direction of the vertical wall portion (43 or 53*a*) (for example, in FIG. 3B, the smoothness is measured at the portion corresponding to a midpoint (H/2) of a length H in the z-direction of the vertical wall portion 43). The smoothness at the portion $PA1_{min}$ and the smoothness at the portion $PA2_{min}$ are both measured on the outer surfaces, namely, the surfaces which have contacted the die during the hot press forming.

The difference [SaA1−SaA2] is 0.20 μm or more.

A difference [SaA1−SaA2] in smoothness between the top wall portion and the vertical wall portion within this range indicates that when the press-formed product was produced by performing hot press forming on an Al-plated steel sheet, a portion of the steel sheet which would become the vertical wall portion experienced a higher surface pressure, as compared to the portion which would become the top wall portion. This is because sliding of the vertical wall portion against the die with a high surface pressure causes the surface of the vertical wall portion to become smoother than the surface of the top wall portion. Therefore, it can be said that this press-formed product was formed by hot press forming under conditions such that the vertical wall portion to which a high surface pressure is applied is susceptible to scratches due to sliding. When the difference [SaA1−SaA2] in the smoothness is 0.30 μm or more, it can be said that the press-formed product has been formed under conditions in which the vertical wall portion is more susceptible to scratches due to sliding.

The maximum value of the difference [SaA1−SaA2] in the smoothness is more preferably 2.0 μm or less, from the viewpoint of sharpness after painting.

Each of the smoothnesses [SaA1] and [SaA2] refers to an arithmetic mean height Sa (unit: μm) defined in ISO 25178-2 (2012). The measuring apparatus, the measurement conditions and the like are as follows.

Measuring apparatus: a shape analysis laser microscope VK-X 250/150 manufactured by Keyence Corporation Measurement region: a 5 mm×5 mm region with the central point of $PA1_{min}$ or $PA2_{min}$ located at the center of the measurement region Measurement conditions: Gaussian filter was used S filter: not used L filter: 4 mm Difference in Surface Texture Aspect Ratio Between Top Wall Portion and Vertical Wall Portion (Second Aspect)

In the press-formed product according to the second aspect, the difference in the surface texture aspect ratio between the top wall portion and the vertical wall portion is small. Specifically, the surface texture aspect ratios of the top wall portion (41 shown in FIG. 3B or 51 shown in FIG. 4B) and the vertical wall portion (43 shown in FIG. 3B, or 53*a* shown in FIG. 4B) are measured at the portion $PA1_{min}$ and at the portion $PA2_{min}$, respectively, to obtain a surface texture aspect ratio [StrA1] and a surface texture aspect ratio [StrA2], respectively, as with the measurement of the smoothness. As with the measurement of the smoothness, each of the surface texture aspect ratios is measured on the outer surface, namely, the surface which has contacted the die during the hot press forming.

The difference [StrA1−StrA2] is 0.50 or less.

A smaller difference [StrA1−StrA2] in the surface texture aspect ratio between the top wall portion and the vertical wall portion indicates that the occurrence of scratches due to sliding is reduced in the vertical wall portion in the press-formed product, even though the portion which would become the vertical wall portion experienced a high surface pressure during the hot press forming, as compared to the portion which would become the top wall portion. When scratches due to sliding significantly have occurred at a given portion, the surface texture aspect ratio Str at the portion decreases because the scratches are in the form of streaks. Further, the portion at which the scratches have occurred forms a glossy part before painting. After painting, since a difference in glossiness is generated, the scratched portion appears like a pattern when visually observed, resulting in poor surface quality. In contrast, by regulating the difference [StrA1−StrA2] in the surface texture aspect ratio to be small, it is possible to obtain a press-formed product according to the second aspect in which the difference in glossiness after painting is 25 or less, and the press-formed product has excellent surface quality.

In a press-formed product formed using a high-hardness steel base material having a hardness Hv_Parts of HV 400 or more, delayed fracture is more likely to occur due to hydrogen embrittlement or the like, particularly at a portion at which stress is concentrated during the press forming. However, in the press-formed product according to the second aspect, it can be said that the concentration of stress to the vertical wall portion is also reduced, because the occurrence of scratches in the vertical wall portion is reduced as described above. Accordingly, delayed fracture, which tends to occur at a stress-concentrated portion, is also reduced.

Further, the difference [StrA1−StrA2] in the surface texture aspect ratio is preferably 0.50 or less, and more preferably 0.40 or less, from the viewpoint of obtaining excellent surface quality and reducing delayed fracture.

Each of the surface texture aspect ratios [StrA1] and [StrA2] refers to the surface texture aspect ratio "Str" defined in ISO 25178-2 (2012). The measuring apparatus, the measurement conditions and the like are as follows.

Measuring apparatus: a shape analysis laser microscope VK-X 250/150 manufactured by Keyence Corporation Measurement region: a 5 mm×5 mm region with the central point of $PA1_{min}$ or $PA2_{min}$ located at the center of the measurement region Measurement conditions: Gaussian filter was used S filter: not used L filter: 4 mm The method used for adjusting the difference [StrA1−StrA2] in surface texture aspect ratio between the top wall portion and the vertical wall portion within the above-described range is not particularly limited, and may be a method in which a press-formed product is formed by the above-described method of producing a hot press-formed product according to the present embodiment.

When a press-formed product is formed using the method of producing a hot press-formed product according to the present embodiment, adhesion to the die can be reduced. A large amount of adhesion causes an increase in the friction coefficient, making scratches due to sliding more likely to occur. However, when the amount of adhesion is reduced as described above, an increase in the friction coefficient is also curbed, and the occurrence of scratches due to sliding in the vertical wall portion is reduced. It is conceivable that the difference [Str1−Str2] in the surface texture aspect ratio can be controlled within the above-described range due to the above mechanism.

Average Thickness of Zinc Oxide Layer (First and Second Aspects)

In the press-formed products according to the first and second aspects, the zinc oxide (ZnO) layer, which is an outermost surface layer, preferably has an average thickness of from 0.3 µm to 2.0 µm, and more preferably from 0.4 µm to 1.5 µm.

The average thickness as used herein refers to the average thickness of the ZnO layer measured at a portion at which sliding against the die at the time of hot press forming was small, specifically, the average thickness of the ZnO layer at the inner side of the top wall portion 31, 41, or 51 in the case of the press-formed product 30, 40, or 50 shown in FIG. 2A, FIG. 3B, or FIG. 4B.

When the average thickness of the ZnO layer is 0.3 µm or more, adhesion to the die during hot press forming can be reduced. When the average thickness of the ZnO layer is 2.0 µm or less, excellent weldability can be obtained, and, also, a high corrosion resistance can be maintained because the Al plating layer is prevented from being too thin.

The average thickness of the ZnO layer may be controlled by adjusting a holding time of heating during hot press forming or by applying the ZnO film before forming.

The average thickness of the ZnO layer is measured at a portion at which sliding against the die at the time of hot press forming was small, as described above. Specifically, the measurement of the thickness is performed as follows.

The press-formed product is cut in a transverse cross section, and the plating layer structure at the outermost surface layer of the top wall portion in the cross section is observed and analyzed using an electron microscope JSM-7001F manufactured by JEOL Ltd. Thereafter, the thickness of the ZnO layer present at the outermost surface is measured in a sheet thickness direction, at a portion at which the ZnO layer thickness is largest.

The measurement is performed at randomly selected three points at the inner side of the top wall portion, and the average of the measured values is calculated.

EXAMPLES

Next, the present disclosure will be described in further detail, with reference to examples. It is noted, however, that the present disclosure is in no way limited to the following Examples.

<<Preparation of Plated Steel Sheets>>
<Al-Plated Steel Sheet (A1)>

An Al plating layer was formed, by a Sendzimir process, on both sides of a cold-rolled steel sheet (including, in % by mass, 0.21% of C; 0.12% of Si; 1.21% of Mn; 0.02% of P; 0.012% of S; 0.02% of Ti; 0.03% of B; and 0.04% of Al; with the balance being Fe and impurities) having a thickness of 1.6 mm. The annealing temperature was about 800° C., and an Al plating bath included 9% by mass of Si, and also included Fe dissolved from the cold-rolled steel sheet. The deposited amount (areal weight) of the Al plating layer after plating was adjusted by a gas wiping method, such that the deposited amount (areal weight) of the Al plating layer provided on each side (each of the upper surface and the lower surface) of the cold-rolled steel sheet was 40 g/m$^2$, followed by cooling. Subsequently, on the Al plating layer provided on each side, a chemical solution (NANOTEK SLURRY, manufactured by C.I. Kasei Co., Ltd.; particle size of zinc oxide particles=70 nm) was applied using a roll coater, and the coating was baked at about 80° C., to form a ZnO film having a deposited amount (in terms of Zn) of 0.8 g/m$^2$ on each side.

In this manner, a sample material of an Al-plated steel sheet (A1) was obtained.

<Al-Plated Steel Sheets (A2, M3, K4, and Z5)>

Sample materials of Al-plated steel sheets were obtained in the same manner as that in the preparation of the Al-plated steel sheet (A1), except that the deposited amount (areal weight) of the Al plating layer on the upper surface and the lower surface, the presence or absence of the film, the material of the film, the deposited amount (in terms of Zn) of the film on the upper surface and the lower surface, are changed as shown in the following Table 1.

TABLE 1

| | Plating layer | | Film | | |
|---|---|---|---|---|---|
| | | | | Deposited amounts | |
| No. | Type of plating | Areal weights (upper surface/ lower surface) [g/m$^2$] | Film | (in terms of Zn) (upper surface/ lower surface) [g/m$^2$] | Hardness HV of material surface |
| A1 | Al plating | 40/40 | ZnO | 0.8/0.8 | 800 |
| A2 | Al plating | 80/80 | ZnO | 0.8/0.8 | 800 |
| M3 | Al plating | 80/80 | absent | | 820 |
| K4 | Al plating | 40/40 | Metallic soap | 7.2/7.2 | 820 |
| Z5 | Al plating | 80/80 | Metallic Zn | 0.8/0.8 | 820 |

Example A

<<Preparation of Dies>>
Base Materials

Figure 8:
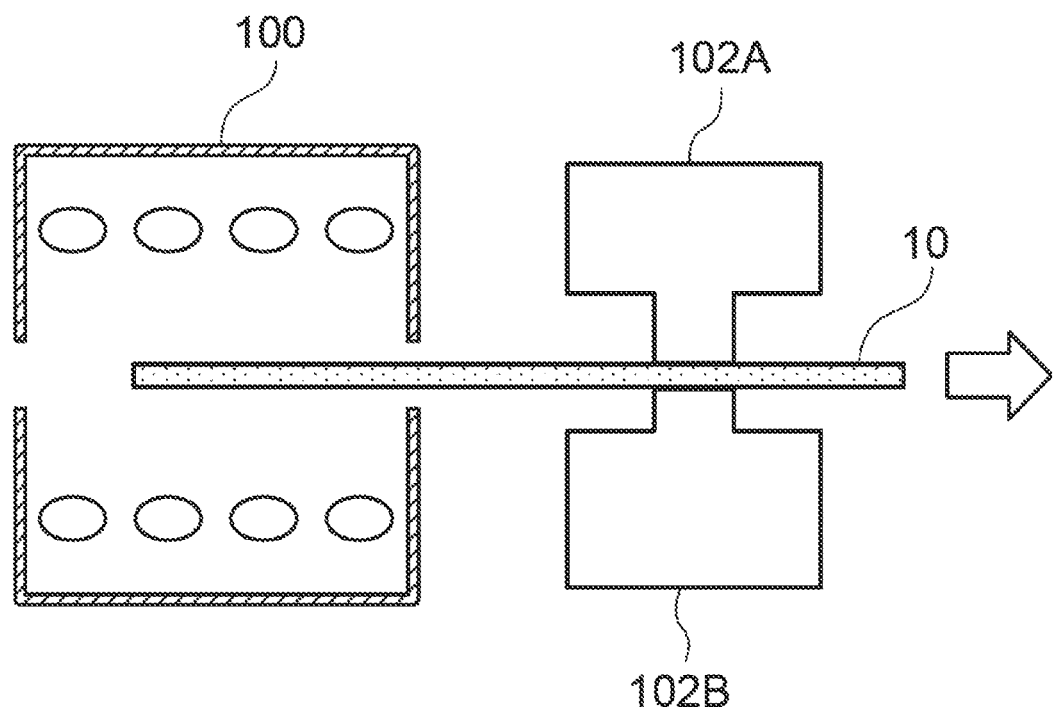
FIG. 8 is a schematic structural diagram illustrating an apparatus for evaluating hot lubricity.

A steel of which the material is shown in Table 1 was prepared, and, in an annealing state, roughly formed into shapes close to an upper die 102A and a lower die 102B illustrated in FIG. 8. Thereafter, the resultants were quenched by maintaining heating at 1,180° C. in vacuum and then cooling with nitrogen gas, and then refined to 64 HRC by tempering within the range of from 540 to 580° C. Subsequently, finishing processing was performed to obtain base materials of the dies.

Formation of Nitride Layer

Next, a nitride layer was formed on the steel sheet contact surface of each of the upper die 102A and the lower die 102B that is configured to contact (slides against) the plated steel sheet 10.

Then, each of the base materials was subjected to an ion nitriding treatment under the conditions shown below. Specifically, after performing an ion nitriding treatment under the conditions including an N$_2$ (with remaining H$_2$) atmosphere at a flow rate ratio of 5%, a temperature of 500° C., and a holding time of 5 hours, each test surface was finished by polishing, to form a nitride layer.

Formation of PVD Film

To the portion of each base material provided with the nitride layer, a bias voltage of −400 V was applied using an arc ion plating apparatus in an Ar atmosphere under a pressure of 0.5 Pa, and a plasma cleaning with a hot filament was performed for 60 minutes. Thereafter, a PVD film was formed using various types of metal targets as evaporation sources of metal components, and using basically N₂ gas and optionally CH₄ gas as a reaction gas, at a base material temperature of 500° C., a reaction gas pressure of 3.0 Pa, and a bias voltage of −50V.

Example 1

Dies (upper die 102A and lower die 102B) were prepared in accordance with the method described in the section of <<Preparation of Dies>> above, using the composition of the PVD film shown in the following Table 2, and adjusting the hardness of the PVD film to the value shown in the following Table 2.

The skewness (Rsk) of the steel sheet contact surface of the resulting die in the sliding direction of the contacting (sliding) plated steel sheet 10 was measured in accordance with the above-described method. Further, the hardness Hv_Die of the steel sheet contact surface of the resulting die was measured in accordance with the above-described method.

Using the plated steel sheet and the dies shown in Table 2, the evaluations described below were performed.

Examples 2 to 21

Dies (upper die 102A and lower die 102B) were prepared in accordance with the method described in the section of <<Preparation of Dies>> above, using the composition of the PVD film shown in the following Table 2, and adjusting the hardness of the PVD film to the value shown in the following Table 2.

Using the plated steel sheets and the dies shown in Table 2, the evaluations described below were performed.

With respect to the "DLC film" in Example 5 (Condition No. 7), it was unable to ensure a sufficient film thickness using the PVD method, and, therefore, a plasma CVD method was used to form a hard layer having a film thickness of 2 μm.

Further, in each of Example 11 (Condition No. 13) and Example 20 (Condition No. 25), an AlVN film was layered on an AlCrN film to form a laminated film.

Comparative Example 1

Dies (upper die 102A and lower die 102B) were prepared in the same manner as that in Example 1, except that the nitride layer and the PVD film were not formed in the preparation of the die.

Using the plated steel sheet and the dies shown in Table 2, the evaluations described below were performed.

Comparative Example 2

Dies (upper die 102A and lower die 102B) were prepared in the same manner as that in Example 1, except that the PVD film was not formed in the preparation of each die.

Using the plated steel sheet and the dies shown in Table 2, the evaluations described below were performed.

Comparative Example 3

Dies (upper die 102A and lower die 102B) were prepared in the same manner as that in Example 1, except that a "WC film" was further formed on the PVD film of AlCrN in the preparation of each die.

Using the plated steel sheet and the dies shown in Table 2, the evaluations described below were performed.

Comparative Examples 4 and 5

Dies (upper die 102A and lower die 102B) were prepared in accordance with the method described in the section of <<Preparation of Dies>> above, using the composition of the PVD film shown in the following Table 2, and adjusting the hardness of the PVD film to the value shown in the following Table 2.

Using the plated steel sheets and the dies shown in Table 2, the evaluations described below were performed.

<Evaluations>

Die Wear

First, an apparatus for evaluating hot lubricity was prepared. The apparatus for evaluating hot lubricity shown in FIG. 8 includes: a near infrared furnace 100; and dies consisting of the upper die 102A and the lower die 102B. Each of the upper die 102A and the lower die 102B includes a protruding portion extending in a direction orthogonal to a drawing direction of the plated steel sheet and having a width of 10 mm. The upper and the lower dies apply a predetermined pressing load by sandwiching the sample material between the top surfaces of the protruding portions of the dies. The apparatus for evaluating hot lubricity is provided with a thermocouple (not shown) for measuring the temperature of a plated steel sheet when heated by the near infrared furnace 100, and the temperature of the plated steel sheet when sandwiched between the dies. The reference numeral 10 shown in FIG. 8 indicates a sample material of the plated steel sheet.

Using the apparatus for evaluating hot lubricity shown in FIG. 8, a sample material having a size of 30 mm×500 mm was heated by the near infrared furnace 100 to 920° C. in a nitrogen atmosphere. Thereafter, the sample material heated to about 700° C. was drawn through the dies consisting of the upper die 102A and the lower die 102B while a pressing load of 3 kN was applied to the sample material (namely, while allowing the sample material to slide against the dies), wherein the drawing length was set at 100 mm, and the drawing speed was set at 40 mm/s. When heating the sample material to a temperature of 920° C., the average rate of temperature rise was set at 7.5° C./sec.

The difference in surface profiles of the steel sheet contact surfaces of the dies in the apparatus for evaluating hot lubricity that come into contact with (slide against) the plated steel sheet 10, between before and after performing the test for evaluating the hot lubricity described above, was analyzed to measure the amount of die wear. Specifically, the profiles of the die surfaces of the sliding portions were measured before and after sliding, using a contact-type shape measuring apparatus, to determine the amount of die wear. An average amount of die wear was calculated from the respective surface profiles of the upper die and the lower die, and the calculated average value was defined as the amount of die wear.

The evaluation was performed based on the thus determined amount of die wear, in accordance with the following evaluation criteria.

A: the amount of die wear is 0.5 μm or less
B: the amount of die wear is from more than 0.5 μm to 1 μm
C: the amount of die wear is from more than 1 μm to 2 μm
D: the amount of die wear is more than 2 μm Adhesion The adhesion to the dies was evaluated by the following test.

The difference in the surface profiles of the steel sheet contact surfaces of the dies in the apparatus for evaluating hot lubricity that come into contact with (slide against) the plated steel sheet 10, between before and after performing the test for evaluating the hot lubricity described above, was analyzed to measure the amount of adhesion on the dies. Specifically, the profiles of the die surfaces of the sliding portions were measured before and after sliding, using a contact-type shape measuring apparatus, to determine an adhesion height at a position at which the height of the adhered substance was largest (hereinafter, referred to as "maximum adhesion height on die"). The maximum value of the measured adhesion heights of the upper die and the lower die was defined as the maximum adhesion height on die.

The evaluation was performed based on the thus determined maximum adhesion height on die, in accordance with the following evaluation criteria.

A: the maximum adhesion height on die is 0.5 μm or less
B: the maximum adhesion height on die is from more than 0.5 μm to 1 μm
C: the maximum adhesion height on die is from more than 1 μm to 3 μm
D: the maximum adhesion height on die is more than 3 μm (Rsk) in the sliding direction of 1.3 or less and a hardness Hv_Die of HV 2,000 or more on the steel sheet contact surface of the die.

Further, in Examples 8 to 11 and 16 to 20, it was confirmed that it is possible to reduce wear on the sliding surface of a die as well as to reduce adhesion to the die, by forming a hard layer having a skewness (Rsk) in the sliding direction of from 0 to 1.3 and having a hardness Hv_Die of from HV 2,500 to HV 3,000 on the steel sheet contact surface of the die.

Example B

<<Preparation of Dies>>

Dies were prepared in the same manner as those of respective Condition Nos. in the "Example A", except that: the dies were changed from the dies prepared in each of Condition Nos. 1, 3, 6, 10, 11, 14, 15, 17 and 19 in the "Example A", such that the dies have shapes capable of producing a press-formed product illustrated in FIG. 2A and FIG. 2B, and such that the portion of the second ridge portion having the minimum curvature radius had the minimum curvature radius [$R_{min}$] indicated in the following Table 3 and Table 4, and, further, such that the base material was changed to exhibit a hardness Hv_Die value at the vertical wall portion indicated in the following Table 3 and Table 4.

TABLE 2

| Condition No. | | Plated steel sheet | Dies Base Material | Nitride layer | PVD film | HV_Die (HV, 20° C.) | Rsk | Evaluation Wear | Adhesion |
|---|---|---|---|---|---|---|---|---|---|
| 1 | Comparative Example 1 | A1 | SKD61 | Absent | Absent | 550 | −2.5 | D | A |
| 2 | Comparative Example 2 | A1 | SKD61 | Present | Absent | 1200 | −0.18 | D | A |
| 3 | Example 1 | A1 | SKD61 | Present | TiCN | 3240 | −0.98 | B | D |
| 4 | Example 2 | M3 | SKD61 | Present | TiCN | 3160 | −0.88 | B | D |
| 5 | Example 3 | A1 | SKD61 | Present | TiAlN | 3400 | 0.8 | C | D |
| 6 | Example 4 | M3 | SKD61 | Present | TiAlN | 3400 | 0.8 | C | D |
| 7 | Example 5 | A1 | SKD61 | Present | DLC | 3250 | 0.32 | B | D |
| 8 | Example 6 | A1 | SKD61 | Present | TiCN | 3160 | −0.88 | B | C |
| 9 | Example 7 | A1 | SKD61 | Present | AlCrN | 3190 | −1.7 | B | B |
| 10 | Example 8 | A1 | SKD61 | Present | AlCrN | 2970 | −0.62 | A | A |
| 11 | Example 9 | A2 | SKD61 | Present | AlCrN | 2970 | −0.62 | A | B |
| 12 | Example 10 | A1 | SKD61 | Present | CrAlN | 2700 | −0.32 | A | A |
| 13 | Example 11 | A1 | SKD61 | Present | AlCrN + AlVN | 2500 | −1.1 | A | A |
| 14 | Example 12 | A1 | SKD61 | Present | TiN | 2000 | −1.9 | B | C |
| 15 | Example 13 | Z5 | SKD61 | Present | TiCN | 2000 | −0.16 | C | C |
| 16 | Example 14 | A1 | SKD61 | Present | CrCN | 2000 | −1.44 | C | B |
| 17 | Example 15 | K4 | SKD61 | Present | CrCN | 2000 | −1.44 | A | B |
| 18 | Comparative Example 3 | A1 | SKD61 | Present | AlCrN + WC | 1500 | 1 | D | A |
| 19 | Comparative Example 4 | A1 | SKD61 | Present | AlCrN | 2970 | 2.1 | D | D |
| 20 | Comparative Example 5 | A1 | SKD61 | Present | AlCrN | 2970 | 1.6 | D | D |
| 21 | Example 16 | A1 | SKD61 | Present | AlCrN | 2970 | −5.0 | A | C |
| 22 | Example 17 | A1 | SKD61 | Present | AlCrN | 2970 | 1.3 | B | A |
| 23 | Example 18 | A1 | SKD61 | Present | AlCrN | 2970 | 0.5 | A | A |
| 24 | Example 19 | A1 | SKD61 | Present | CrAlN | 2700 | 0.02 | A | A |
| 25 | Example 20 | A2 | SKD61 | Present | AlCrN + AlVN | 2500 | 0.8 | A | A |
| 26 | Example 21 | A1 | SKD61 | Present | AlCrN | 3190 | 0.3 | B | B |

From the results in Examples 1 to 18 shown in Table 2, it was confirmed that the wear on the sliding surface of a die can be reduced by forming a hard layer having a skewness Here, the nitride layer and the PVD film were formed over the entirety of a region of each die that at which contact between the die and the material are expected to occur.

<<Preparation of Press-Formed Products>>

Using each of the dies of Condition Nos. shown in Table 3 and Table 4, hot press forming was performed under the following conditions including a furnace temperature set at 920° C., an in-furnace time of 5 minutes (in-furnace time of 6 minutes only for Formed Product No. 11), and a temperature at the start of forming of 700° C.

For each of the resulting press-formed products, the following properties were measured in accordance with the above-described methods: the curvature radius [$R_{min}$] at the portion of the second ridge portion having the minimum curvature radius; the smoothness [SaA1] at the central portion PA1$_{min}$ in the cross-sectional width direction of the top wall portion, in a transverse cross section at which the curvature radius of the second ridge portion is smallest when transverse cross sections of the press-formed product are observed; the smoothness [SaA2] at the central portion PA2$_{min}$ in the cross-sectional height direction of the vertical wall portion, in the above-described transverse cross section; the surface texture aspect ratio [StrA1] at the portion PA1$_{min}$ in the top wall portion; and the surface texture aspect ratio [StrA2] at the portion PA2$_{min}$ in the vertical wall portion. The measured results are shown in Table 3.

Further, for each of the resulting press-formed products, the following properties were measured in accordance with the above-described methods: the curvature radius [$R_{min}$] at the portion of the second ridge portion having the minimum curvature radius; the smoothness [SaB1] at the central portion PB1$_{min}$ which is the central portion in the width direction of the top wall portion and which corresponds to the portion PB0$_{min}$ at which the curvature radius of the flange portion is smallest when observed from the side surface side; the smoothness [SaB2] at the central portion PB2$_{min}$ which is the central portion in the height direction of the vertical wall portion and which corresponds to the portion PB0$_{min}$ when observed from the side surface side; the surface texture aspect ratio [StrB1] at the portion P1$_{min}$ in the top wall portion; and the surface texture aspect ratio [StrB2] at the portion PB2$_{min}$ in the vertical wall portion. The measured results are shown in Table 4.

Using each of the press-formed products shown in Table 3 and Table 4, the evaluations described below were performed.

<Evaluations>

Surface Quality of Vertical Wall Portion

For each of the resulting press-formed products of the above-described Formed Product Nos., electrodeposition coating was performed to a film thickness of 15 and further, overcoating was performed to a film thickness of 20 μm. Thereafter, the surface quality at the vertical wall portion of the resulting coated product was evaluated in accordance with the following criteria.

A: excellent surface quality (difference in glossiness<15, no flaws on the surface)
B: acceptable surface quality (15≤difference in glossiness<30, no flaws on the surface)
C: unacceptable surface quality (difference in glossiness≥30, no flaws on the surface)
D: having surface defects, and thus unacceptable (with streak-like flaws on the product surface)

Difference in Glossiness

The glossiness was measured at the central portion PB1$_{min}$ in the top wall portion and the central portion PB2$_{min}$ in the vertical wall portion. The PB1$_{min}$ is the central portion in the width direction of the top wall portion, and, when observed from the side surface side, corresponds to the portion PB0$_{min}$ at which the curvature radius of the flange portion is smallest. The central portion PB2$_{min}$ is the central portion in the height direction of the vertical wall portion, and corresponds to the portion PB0$_{min}$ when observed from the side surface side. The glossiness at PB1$_{min}$ and the glossiness at PB2$_{min}$ were each measured by the following method, and the difference in glossiness between these two portions was calculated.

In the measurement of the glossiness, a relative value of a reflectance, which is determined taking the reflectance of a black mirrored glass having n value of 1.567 defined in JIS Z 8741 (1997) as 100, was measured at an incident angle of light of 60°.

TABLE 3

| Formed Product No. | Condition No. | Plated steel sheet | Minimum curvature radius [$R_{min}$] (mm) | HV_Parts of vertical wall portion of base material (HV, 20° C.) | Smoothness of top wall portion [SaA1] (μm) | Smoothness of vertical wall portion [SaA2] (μm) | [SaA1-SaA2] | Surface texture aspect ratio of top wall portion [StrA1] | Surface texture aspect ratio of vertical wall portion [StrA2] | [StrA1-StrA2] | Evaluation Difference in glossiness | Product Evaluation |
|---|---|---|---|---|---|---|---|---|---|---|---|---|
| 1 | 1 | A1 | 10 | 450 | 1.527 | 1.268 | 0.259 | 0.83 | 0.16 | 0.670 | 42 | C |
| 2 | 1 | A1 | 5 | 450 | 1.580 | 1.178 | 0.402 | 0.83 | 0.05 | 0.781 | 62 | D |
| 3 | 3 | A1 | 8 | 450 | 1.155 | 0.860 | 0.295 | 0.82 | 0.45 | 0.372 | 16 | B |
| 4 | 3 | A1 | 3 | 450 | 1.290 | 0.760 | 0.530 | 0.78 | 0.33 | 0.452 | 24 | B |
| 5 | 10 | A1 | 8 | 450 | 1.293 | 0.901 | 0.393 | 0.88 | 0.65 | 0.223 | 10 | A |
| 6 | 10 | A1 | 5 | 450 | 1.115 | 0.656 | 0.459 | 0.85 | 0.59 | 0.263 | 11 | A |
| 7 | 11 | A2 | 3 | 450 | 1.739 | 1.149 | 0.590 | 0.82 | 0.65 | 0.172 | 12 | A |
| 8 | 6 | M3 | 8 | 300 | 1.253 | 0.948 | 0.304 | 0.80 | 0.34 | 0.460 | 24 | B |
| 9 | 15 | Z5 | 8 | 550 | 1.096 | 0.723 | 0.374 | 0.77 | 0.28 | 0.490 | 29 | B |
| 10 | 19 | A1 | 8 | 650 | 1.008 | 0.695 | 0.313 | 0.91 | 0.06 | 0.845 | 52 | D |
| 11 | 17 | K4 | 5 | 450 | 3.339 | 2.697 | 0.642 | 0.84 | 0.70 | 0.136 | 9 | A |

TABLE 4

| | | | | | | | | | | | Evaluation | |
|---|---|---|---|---|---|---|---|---|---|---|---|---|
| Formed Product No. | Condition No. | Plated steel sheet | Minimum curvature radius [$R_{min}$] (mm) | HV_Parts of vertical wall portion of base material (HV, 20° C.) | Smoothness of top wall portion [SaB1] (μm) | Smoothness of vertical wall portion [SaB2] (μm) | [SaB1-SaB2] | Surface texture aspect ratio of top wall portion [StrB1] | Surface texture aspect ratio of vertical wall portion [StrB2] | [StrB1-SaB2] | Difference in glossiness | Product Evaluation |
| 1 | 1 | A1 | 10 | 450 | 1.491 | 1.251 | 0.240 | 0.82 | 0.16 | 0.657 | 43 | C |
| 2 | 1 | A1 | 5 | 450 | 1.546 | 1.146 | 0.400 | 0.85 | 0.04 | 0.806 | 65 | D |
| 3 | 3 | A1 | 8 | 450 | 1.137 | 0.830 | 0.307 | 0.86 | 0.48 | 0.384 | 17 | B |
| 4 | 3 | A1 | 3 | 450 | 1.254 | 0.780 | 0.473 | 0.77 | 0.33 | 0.444 | 25 | B |
| 5 | 10 | A1 | 8 | 450 | 1.239 | 0.879 | 0.360 | 0.88 | 0.63 | 0.249 | 10 | A |
| 6 | 10 | A1 | 5 | 450 | 1.137 | 0.657 | 0.480 | 0.84 | 0.57 | 0.272 | 12 | A |
| 7 | 11 | A2 | 3 | 450 | 1.736 | 1.109 | 0.627 | 0.82 | 0.64 | 0.183 | 11 | A |
| 8 | 6 | M3 | 8 | 300 | 1.256 | 0.950 | 0.306 | 0.80 | 0.34 | 0.460 | 26 | B |
| 9 | 15 | Z5 | 8 | 550 | 1.144 | 0.758 | 0.387 | 0.76 | 0.28 | 0.480 | 29 | B |
| 10 | 19 | A1 | 8 | 650 | 1.018 | 0.685 | 0.333 | 0.89 | 0.06 | 0.829 | 51 | D |
| 11 | 17 | K4 | 5 | 450 | 3.307 | 2.767 | 0.540 | 0.85 | 0.72 | 0.133 | 8 | A |

Formed Product No. 1

In Formed Product No. 1, the minimum curvature radius [$R_{min}$] at the second ridge portion is large. Thus, it is considered that a low surface pressure was applied to the vertical wall portion, resulting in a small difference [SaB1-SaB2] in smoothness.

Formed Products Nos. 2 and 10

In each of the Formed Products Nos. 2 and 10, the minimum curvature radius [$R_{min}$] at the second ridge portion is smaller than that of Formed product No. 1. Thus, it is considered that a higher surface pressure was applied to the vertical wall portion, resulting in a larger difference [SaB1-SaB2] in the smoothness.

In the hot press forming performed using dies which satisfy at least one of the requirement that the hardness Hv_Die is less than HV 2,000 or the requirement that the skewness (Rsk) is more than 1.3, plating adhesion to the dies occurred and caused scratches on the vertical wall portion. As a result, the surface texture aspect ratios [StrA2] and [StrB2], which are parameters indicating an anisotropy of surface state, of the vertical wall portion significantly decrease to a value close to 0.

Further, since there is a difference in the degree of reflection of light between the ZnO layer and the scratched portion of the vertical wall portion, the difference in glossiness increases.

Formed Product Nos. 3 to 9

In each of the Formed Products Nos. 3 to 9, the minimum curvature radius [$R_{min}$] at the second ridge portion is smaller than that of Formed product No. 1. Thus, it is considered that a high surface pressure was applied to the vertical wall portion, resulting in a large difference [SaB1-SaB2] in the smoothness.

However, in the hot press forming performed using dies which satisfy both of the requirement that the skewness (Rsk) is 1.3 or less and the requirement that the hardness Hv_Die is from HV 2,000 to HV 3,200, the occurrence of scratches on the vertical wall portion is reduced, and a decrease in the surface texture aspect ratios [StrA2] and [StrB2], which are parameters indicating an anisotropy of the surface state, of the vertical wall portion is also reduced.

As a result, the difference in glossiness between the vertical wall portion and the top wall portion is small.

Formed Product Nos. 8 to 10

These are examples in which base materials for press-formed products have different strengths.

Formed Product No. 11

This is an example in which the type of the film is different.

It is noted that the "HV_Parts of vertical wall portion of base material (HV, 20° C.)" indicated in Table 3 and Table 4 refers to a hardness HV_Parts obtained by measurement of a sample collected at a position at a ¼ depth of the sheet thickness at the vertical wall portion of the press-formed product.

Preferable embodiments of the present disclosure have been described above in detail, with reference to accompanying drawings. It is needless to say, however, that the present disclosure is not limited to the Examples described above. It is obvious that a person having ordinary knowledge in the technical field to which the present disclosure belongs can conceive various changes and modifications within the scope of the technical idea described in the claims, and these changes and modifications also understandably belong to the technical scope of the present disclosure.

The disclosure of Japanese Patent Application No. 2018-077794 is incorporated herein by reference in its entirety.

All publications, patent applications, and technical standards mentioned in the present specification are incorporated herein by reference to the same extent as if each individual publication, patent application, or technical standard was specifically and individually indicated to be incorporated by reference.

REFERENCE SIGNS LIST

10 plated steel sheet
11, 111 die
11A, 111A steel sheet contact surface
11B, 111B die shoulder portion
11C, 111C hard layer
11D, 111D die hole
12 holder (steel blank holder)
12C second hard layer
13 punch
100 near infrared furnace 102A upper die
102B lower die
112 steel sheet
113 punch
113C second hard layer
114A, 114B aluminum plating layer
116A, 116B zinc compound layer or metallic zinc layer

The invention claimed is:

1. A method of producing a hot press-formed product, the method comprising:
subjecting an Al-plated steel sheet to hot press forming using a die, the Al-plated steel sheet having a zinc compound layer or a metallic zinc layer, as an outermost surface layer, provided on an Al plating layer,
wherein the die comprises a hard layer having a skewness (Rsk), as measured in a direction from an outside of a die hole toward an inside of the die hole, of 1.3 or less and a hardness Hv_Die of HV 2,000 or more, over an entirety of a region of a steel sheet contact surface that is adjacent to a die shoulder portion, the steel sheet contact surface being located outside of the die hole and configured to contact with the Al-plated steel sheet that is to be subjected to the hot press forming.

2. The method of producing a hot press-formed product according to claim 1, wherein the skewness (Rsk) of the hard layer is −5.0 or more.

3. The method of producing a hot press-formed product according to claim 1, wherein the hard layer comprises: a nitride layer; and a hard coating layer provided on a surface of the nitride layer.

4. The method of producing a hot press-formed product according to claim 3, wherein the hard coating layer has a hardness Hv_Die of HV 3,200 or less.

5. The method of producing a hot press-formed product according to claim 4, wherein the hard coating layer comprises Cr.

6. The method of producing a hot press-formed product according to claim 3, wherein the hard coating layer comprises Ti and has a hardness Hv_Die of HV 3,160 or less.

7. The method of producing a hot press-formed product according to claim 3, wherein the hard coating layer has a hardness Hv_Die of from HV 2,500 to HV 3,000.

8. A die, comprising a hard layer having a skewness (Rsk), as measured in a direction from an outside of a die hole toward an inside of the die hole, of 1.3 or less and a hardness Hv_Die of HV 2,000 or more, over an entirety of a region of a die shoulder adjacent surface that is adjacent to a die shoulder portion, the die shoulder adjacent surface being located outside of the die hole and adjacent to the die shoulder portion.

9. The die according to claim 8, wherein the skewness (Rsk) of the hard layer is −5.0 or more.

10. The die according to claim 8, wherein the hard layer comprises: a nitride layer; and a hard coating layer provided on a surface of the nitride layer.

11. The die according to claim 10, wherein the hard coating layer has a hardness Hv_Die of 3,200 or less.

12. The die according to claim 11, wherein the hard coating layer comprises Cr.

13. The die according to claim 10, wherein the hard coating layer comprises Ti and has a hardness Hv_Die of HV 3,160 or less.

14. The die according to claim 10, wherein the hard coating layer has a hardness Hv_Die of from HV 2,500 to HV 3,000.

15. A die set, comprising:
the die according to claim 8; and
a steel blank holder;
wherein the steel blank holder comprises a second hard layer having a skewness (Rsk), as measured in a direction from an outside of a punch-insertion portion toward an inside of the punch-insertion portion, of 1.3 or less and a hardness Hv_Die of HV 2,000 or more, over an entirety of a region of a facing surface that faces the region of the die provided with the hard layer, the facing surface facing the die shoulder adjacent surface of the die.

16. The die set according to claim 15, wherein the skewness (Rsk) of the second hard layer is −5.0 or more.

17. The die set according to claim 15, wherein the second hard layer comprises: a second nitride layer; and a second hard coating layer provided on a surface of the second nitride layer.

18. The die set according to claim 17, wherein the second hard coating layer has a hardness Hv_Die of HV 3,200 or less.

19. The die set according to claim 18, wherein the second hard coating layer comprises Cr.

20. The die set according to claim 17, wherein the second hard coating layer comprises Ti and has a hardness Hv_Die of HV 3,160 or less.

21. The die set according to claim 17, wherein the second hard coating layer has a hardness Hv_Die of from HV 2,500 to HV 3,000.

22. A die set, comprising:
the die according to claim 8; and
a punch;
wherein the punch comprises a second hard layer having a skewness (Rsk), as measured in a direction from an outside of a punch portion toward an inside of the punch portion, of 1.3 or less and a hardness Hv_Die of HV 2,000 or more, over an entirety of a region of a facing surface that faces the region of the die provided with the hard layer, the facing surface facing the die shoulder adjacent surface of the die.

23. The die set according to claim 22, wherein the skewness (Rsk) of the second hard layer is −5.0 or more.

24. The die set according to claim 22, wherein the second hard layer comprises: a second nitride layer; and a second hard coating layer provided on a surface of the second nitride layer.

25. The die set according to claim 24, wherein the second hard coating layer has a hardness Hv_Die of HV 3,200 or less.

26. The die set according to claim 25, wherein the second hard coating layer comprises Cr.

27. The die set according to claim 24, wherein the second hard coating layer comprises Ti and has a hardness Hv_Die of HV 3,160 or less.

28. The die set according to claim 24, wherein the second hard coating layer has a hardness Hv_Die of from HV 2,500 to HV 3,000.

* * * * *